US009723570B2

(12) United States Patent
Lou et al.

(10) Patent No.: US 9,723,570 B2
(45) Date of Patent: Aug. 1, 2017

(54) POWER CONTROL METHOD AND APPARATUS

(71) Applicant: Huawei Technologies Co., Ltd., Shenzhen, Guangdong (CN)

(72) Inventors: Panming Lou, Shanghai (CN); Fan Wang, Stockholm (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 14/716,527

(22) Filed: May 19, 2015

(65) Prior Publication Data

US 2015/0341867 A1 Nov. 26, 2015

(30) Foreign Application Priority Data

May 23, 2014 (CN) .......................... 2014 1 0222235

(51) Int. Cl.
| | |
|---|---|
| *H04W 4/00* | (2009.01) |
| *H04W 52/24* | (2009.01) |
| *H04W 74/00* | (2009.01) |
| *H04W 72/08* | (2009.01) |
| *H04W 52/12* | (2009.01) |
| *H04W 52/08* | (2009.01) |
| *H04W 52/22* | (2009.01) |

(52) U.S. Cl.
CPC ......... *H04W 52/241* (2013.01); *H04W 52/12* (2013.01); *H04W 72/082* (2013.01); *H04W 74/006* (2013.01); *H04W 52/08* (2013.01); *H04W 52/226* (2013.01); *H04W 52/228* (2013.01); *H04W 52/242* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 2008/0188259 | A1* | 8/2008 | Blanz ....................... | H04B 7/04 455/522 |
| 2010/0220623 | A1* | 9/2010 | Cave ..................... | H04L 1/0007 370/252 |
| 2010/0298021 | A1* | 11/2010 | Bergman ............ | H04W 52/146 455/522 |

(Continued)

FOREIGN PATENT DOCUMENTS

| | | |
|---|---|---|
| EP | 1 487 132 A2 | 12/2004 |
| EP | 1 672 814 A1 | 6/2006 |
| EP | 1 876 841 A1 | 1/2008 |

*Primary Examiner* — Otis L Thompson, Jr.

(57) ABSTRACT

Embodiments of the present invention disclose a power control method and apparatus, where the method includes: performing a slow fading evaluation on an uplink channel of a UE to obtain a slow fading value of the uplink channel; comparing the slow fading value with a target slow fading value to obtain a first comparison result; generating, according to the first comparison result, first control signaling of a downlink control channel corresponding to the uplink channel, where the first control signaling is used to instruct the UE to adjust transmit power of the UE on the uplink channel; and sending the first control signaling to the user equipment UE. In the embodiments of the present invention, making full use of power efficiency, improving a cell throughput, and reducing neighboring cell interference.

16 Claims, 12 Drawing Sheets

(56) References Cited

U.S. PATENT DOCUMENTS

| | | | | |
|---|---|---|---|---|
| 2011/0009156 A1* | 1/2011 | Goodwin | ............... | H04W 52/58 |
| | | | | 455/522 |
| 2011/0261779 A1* | 10/2011 | Liu | ....................... | H04L 1/0007 |
| | | | | 370/329 |
| 2011/0294439 A1* | 12/2011 | Ofuji | ..................... | H04L 1/0003 |
| | | | | 455/70 |
| 2014/0184440 A1* | 7/2014 | Park | ........................ | H01Q 25/04 |
| | | | | 342/351 |
| 2014/0274196 A1* | 9/2014 | Dai | ..................... | H04W 52/242 |
| | | | | 455/522 |
| 2014/0293811 A1* | 10/2014 | Rao | ...................... | H04B 17/309 |
| | | | | 370/252 |
| 2015/0358921 A1* | 12/2015 | Karlsson | ............... | H04W 52/12 |
| | | | | 370/252 |
| 2016/0057636 A1* | 2/2016 | Ibrahim | ............ | H04W 52/0209 |
| | | | | 370/328 |

\* cited by examiner

POWER CONTROL METHOD AND APPARATUS

CROSS-REFERENCE TO RELATED APPLICATIONS

This application claims priority to Chinese Patent Application No. 201410222235.5, filed on May 23, 2014, which is hereby incorporated by reference in its entirety.

TECHNICAL FIELD

The present invention relates to the field of communications technologies, and in particular, to a power control method and apparatus.

BACKGROUND

With the development of communications technologies, neighboring cells are allowed to use a same frequency in a Universal Mobile Telecommunications System (UMTS, Universal Mobile Telecommunications System), and all users in a same cell receive and transmit signals by using a same frequency. Because all the users receive and transmit signals by using the same frequency, for each user in the UMTS system, inter-cell interference and intra-cell interference may be caused. Therefore, in order to reduce interference to a user, currently, on the premise that a transmission quality requirement of a physical channel is ensured, transmit power of a network side device and transmit power of a user equipment or transmit power of a terminal (UE, User Equipment) are restricted mainly by means of power control.

In the prior art, a base station traces fast fading on an uplink channel, so as to implement inner loop power control. Its implementation principle is as follows: acquiring a signal-to-interference ratio (SIR, Signal-to-Interference Ratio) value of a current uplink channel and comparing the signal-to-interference ratio value with a target SIR value (the target SIR value may be obtained by means of outer loop power control); obtaining a transmit power control command (TPC) of a downlink channel according to a result of the comparing; sending, in each slot, the TPC to a UE through a downlink control channel; and when the UE receives the TPC, adjusting transmit power on the uplink channel in each slot according to the TPC, so as to implement fast power control in an inner loop. For example, an uplink may be a dedicated physical control channel (DPCCH, Didicated Physical Control Channel), an enhanced dedicated physical control channel (E-DPCCH, Enhanced DPCCH), or an enhanced dedicated physical data channel (E-DPDCH Enhanced Dedicated Physical Data Channel). For example, a downlink may be a DPCCH or a fractional-dedicated physical channel (F-DPCH, Fractional-Dedicated Physical Channel).

In traditional Code Division Multiple Access (CDM, Code Division Multiplexing) scheduling, generally multiple users are supported in simultaneously sending data on a DPCCH and a DPDCH/E-DPDCH in one transmission time interval (TTI, Transmission Time Interval), but a near-far effect exists between different UEs. Therefore, a proper overhead of rise over thermal (RoT, Rise over Thermal) that is a ratio between received total wideband power (RTWP, Received Total Wideband Power) and a background noise needs to be allocated to each UE, so that a case in which an uplink channel of another UE cannot be received because one UE occupies extremely high RoT is avoided. Therefore, fast fading of each UE needs to be traced by means of fast power control.

However, the inventor of the present invention finds that, if transmit power of a UE is scheduled based on fixed RoT to trace fast fading, the transmit power of the UE may increase when fast fading is large, which causes relatively strong interference to a neighboring cell; and the transmit power of the UE is relatively small when fast fading is small, which causes weak interference to the neighboring cell. That is, currently, fast power control for an uplink channel cannot well reduce neighboring cell interference.

SUMMARY

Embodiments of the present invention provide a power control method and apparatus, so as to solve a technical problem in the prior art that fast power control for an uplink channel cannot well reduce neighboring cell interference.

To solve the foregoing technical problem, the embodiments of the present invention disclose the following technical solutions:

According to a first aspect, a power control method is provided, where the method includes:

performing a slow fading evaluation on an uplink channel of a user equipment UE to obtain a slow fading value of the uplink channel;

comparing the slow fading value with a target slow fading value to obtain a first comparison result;

generating, according to the first comparison result, first control signaling of a downlink channel corresponding to the uplink channel, where the first control signaling is used to instruct the UE to adjust transmit power of the UE on the uplink channel; and sending the first control signaling to the UE.

In a first possible implementation manner of the first aspect, the method further includes:

evaluating a signal-to-interference ratio of the uplink channel to obtain an evaluation value of the signal-to-interference ratio of the uplink channel;

generating second control signaling of the downlink channel according to the evaluation value of the signal-to-interference ratio, where the second control signaling is used to instruct the UE to select a transport block size TBS; and sending the second control signaling to the UE.

With reference to the first aspect or the first possible implementation manner of the first aspect, in a second possible implementation manner, the method further includes:

evaluating receive power on the uplink channel to obtain an evaluation value of the receive power on the uplink channel;

comparing the evaluation value of the receive power with a receive power value received last time, to obtain a second comparison result;

generating third control signaling of the downlink channel according to the second comparison result, where the third control signaling is used to instruct the UE to select a TBS; and sending the third control signaling to the UE.

With reference to the first aspect or the first or second possible implementation manner of the first aspect, in a third possible implementation manner, the method further includes:

when the slow fading evaluation is performed on the uplink channel, tracing fast fading on an uplink control channel included by the uplink channel, to obtain a fast fading value of the uplink control channel;

comparing the fast fading value with a target fast fading value to obtain a third comparison result;

generating, according to the third comparison result, a power control command TPC of a downlink control channel corresponding to the uplink control channel, where the TPC is used to instruct the UE to adjust transmit power of the UE on the uplink control channel according to the TPC; and sending the TPC to the UE.

According to a second aspect, a power control method is provided, where the method includes:

receiving, by a user equipment UE, first control signaling sent by a network side device, where the first control instruction is a control instruction that is used to adjust transmit power of the UE on an uplink channel and is generated after the network side device compares a slow fading evaluation value of the uplink channel of the UE with a target slow fading value; and adjusting, by the UE, the transmit power of the UE on the uplink channel according to the first control signaling.

In a first possible implementation manner of the second aspect, the method further includes:

calculating, by the UE, a difference between transmit power and average transmit power on a downlink control channel within a preset period of time, where the downlink control channel is a downlink control channel included by a downlink channel corresponding to the uplink channel;

obtaining, by the UE according to the difference, a serving grant SG of an uplink data channel included by the uplink channel;

determining, by the UE, a transport block size TBS according to the SG; and adjusting, by the UE according to the TBS, data sent by the UE on the uplink data channel.

With reference to the second aspect or the first possible implementation manner of the second aspect, in a second possible implementation manner, the method further includes:

receiving, by the UE, second control signaling sent by the network side device, where the second control instruction is a control instruction that instructs, after the network side device performs a slow fading evaluation on the uplink channel, the UE to select a transport block size TBS;

selecting, by the UE, the TBS according to the second control signaling; and adjusting, by the UE according to the selected TBS, the data sent on the uplink data channel.

With reference to the second aspect or the first or second possible implementation manner of the second aspect, in a third possible implementation manner, the method further includes:

receiving, by the UE, a transmit power control command TPC sent by the network side device, where the TPC is a TPC that is used to adjust transmit power on an uplink control channel and is generated after the network side device compares a fast fading trace value of the uplink control channel with a target fast fading trace value; and adjusting, by the UE according to the TPC, the transmit power on the uplink control channel included by the uplink channel.

According to a third aspect, a power control apparatus is provided, where the apparatus includes:

a first evaluating unit, configured to perform a slow fading evaluation on an uplink channel of a user equipment UE to obtain a slow fading value of the uplink channel;

a first comparing unit, configured to compare the slow fading value obtained by the first evaluating unit with a target slow fading value to obtain a first comparison result;

a first generating unit, configured to generate, according to the first comparison result obtained by the first comparing unit by means of comparison, first control signaling of a downlink channel corresponding to the uplink channel, where the first control signaling is used to instruct the UE to adjust transmit power on the uplink channel; and a first sending unit, configured to send the first control signaling generated by the first generating unit to the UE.

In a first possible implementation manner of the third aspect, the apparatus further includes:

a second evaluating unit, configured to evaluate a signal-to-interference ratio of the uplink channel to obtain an evaluation value of the signal-to-interference ratio of the uplink channel;

a second generating unit, configured to generate second control signaling of the downlink channel according to the evaluation value of the signal-to-interference ratio that is obtained by the second evaluating unit, where the second control signaling is used to instruct the UE to select a transport block size TBS; and a second sending unit, configured to send the second control signaling generated by the second generating unit to the UE.

With reference to the third aspect or the first possible implementation manner of the third aspect, in a second possible implementation manner, the apparatus further includes:

a third evaluating unit, configured to evaluate receive power on the uplink channel to obtain an evaluation value of the receive power on the uplink channel;

a second comparing unit, configured to compare the evaluation value of the receive power that is obtained by the third evaluating unit by means of the evaluation with a receive power value received last time, to obtain a second comparison result;

a third generating unit, configured to generate third control signaling of the downlink channel according to the second comparison result obtained by the second comparing unit, where the third control signaling is used to instruct the UE to select the TBS; and a third sending unit, configured to send the third control signaling generated by the third generating unit to the UE.

With reference to the third aspect or the first or second possible implementation manner of the third aspect, in a third possible implementation manner, the apparatus further includes:

a tracing unit, configured to: when the first evaluating unit performs the slow fading evaluation on the uplink channel, trace fast fading on an uplink control channel included by the uplink channel, to obtain a fast fading value of the uplink control channel;

a third comparing unit, configured to compare the fast fading value obtained by the tracing unit with a target fast fading value to obtain a third comparison result;

a fourth generating unit, configured to generate, according to the third comparison result obtained by the third comparing unit, a power control command TPC of a downlink control channel corresponding to the uplink control channel, where the TPC is used to instruct the UE to adjust transmit power on the uplink control channel according to the TPC; and a fourth sending unit, configured to send the TPC generated by the fourth generating unit to the UE.

According to a fourth aspect, a power control apparatus is provided, where the apparatus includes:

a first receiving unit, configured to receive first control signaling sent by a network side device, where the first control instruction is a control instruction that is used to adjust transmit power on an uplink channel and is generated after the network side device compares a slow fading evaluation value of the uplink channel of the UE with a target slow fading value; and a first adjusting unit, configured to adjust the transmit power on the uplink channel according to the first control signaling received by the first receiving unit.

In a first possible implementation manner of the fourth aspect, the apparatus further includes:

a calculating unit, configured to: after the first adjusting unit adjusts the transmit power on the uplink channel, calculate a difference between transmit power and average transmit power on the downlink control channel within a preset period of time, where the downlink control channel is a downlink control channel included by a downlink channel corresponding to the uplink channel;

a first determining unit, configured to obtain, according to the difference obtained by the calculating unit by means of calculation, a serving grant SG of an uplink data channel included by the uplink channel;

a second determining unit, configured to determine a transport block size TBS according to the SG determined by the first determining unit; and a sending unit, configured to send data on the uplink data channel according to the TBS determined by the second determining unit.

With reference to the fourth aspect or the first possible implementation manner of the fourth aspect, in a second possible implementation manner, the apparatus further includes:

a second receiving unit, configured to receive second control signaling sent by the network side device, where the second control instruction is a control instruction that instructs, after the network side device performs a slow fading evaluation on the uplink channel, the UE to select a TBS;

a selecting unit, configured to select the TBS on the uplink channel according to the second control signaling received by the second receiving unit; and a second adjusting unit, configured to adjust, according to the TBS selected by the selecting unit, the data sent on the uplink data channel.

With reference to the fourth aspect or the first or second possible implementation manner of the fourth aspect, in a third possible implementation manner, the apparatus further includes:

a third receiving unit, configured to receive a transmit power control command TPC sent by the network side device, where the TPC is a TPC that is used to adjust transmit power on an uplink control channel and is generated after the network side device compares a fast fading trace value of the uplink control channel included by the uplink channel with a target fast fading trace value; and a third adjusting unit, configured to adjust the transmit power on the uplink control channel according to the TPC received by the third receiving unit.

It can be learned from the foregoing technical solutions that, in the embodiments of the present invention, a slow fading evaluation is performed on an uplink channel of a UE. That is, the slow fading evaluation is introduced for uplink inner loop power control. Control signaling is generated by using a result of comparing a slow fading value obtained by means of the evaluation with a target slow fading value, where the control signaling is used to instruct the UE to adjust transmit power of the UE on the uplink channel, thereby making full use of power efficiency, improving a cell throughput, and reducing neighboring cell interference.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The terms used in the embodiments of the present invention are merely for the purpose of illustrating specific embodiments, but are not intended to limit the present invention. The terms "a", "said" and "the" of singular forms used in the embodiments and the appended claims of the present invention are also intended to include plural forms, unless otherwise specified in the context clearly. It should also be understood that, the term "and/or" used in this specification indicates and includes any or all possible combinations of one or more associated listed items.

It should be understood that, although terms such as first, second, and third may be used in the embodiments of the present invention to describe various types of information, the information should not be limited by these terms. These terms are only used to differentiate information of a same type. For example, without departing from the scope of the embodiments of the present invention, first information may also be referred to as second information, and similarly, the second information may also be referred to as the first information. This depends on a context, for example, a word "if" used herein may be construed as "at the time of", "when", or "in response to determining".

Figure 1:
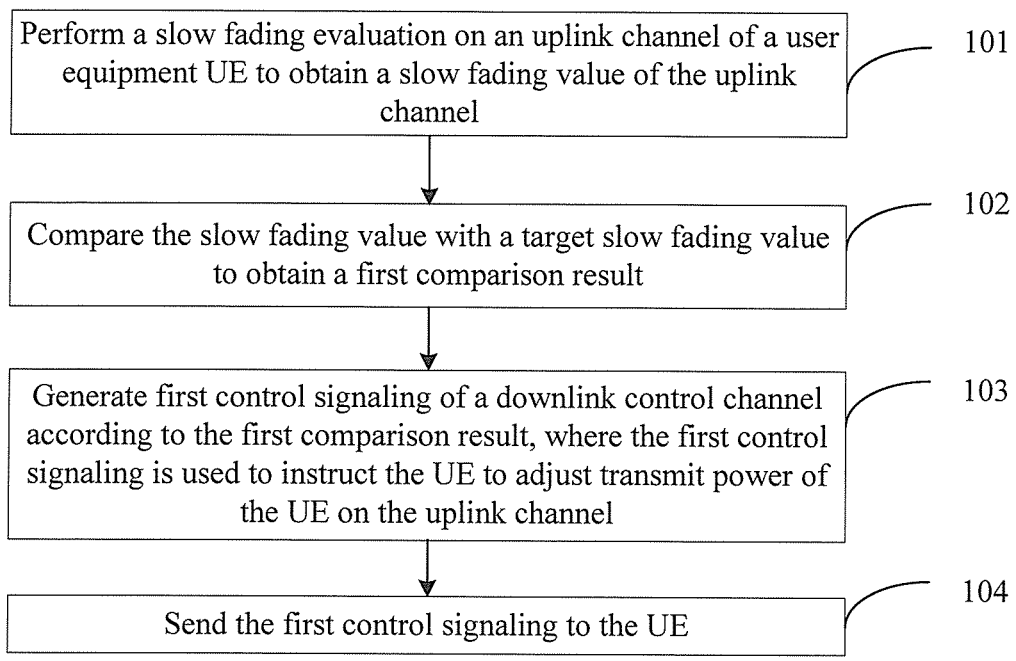
FIG. 1 is a flowchart of a power control method according to an embodiment of the present invention.

Referring to FIG. 1, FIG. 1 is a flowchart of a power control method according to an embodiment of the present invention, where the method includes:

Step 101: Perform a slow fading evaluation on an uplink channel of a user equipment UE to obtain a slow fading value of the uplink channel.

The slow fading evaluation may be a slow fading evaluation on receive power on the uplink channel, and an obtained slow fading value is a slow fading value of the receive power; or may be a slow fading evaluation on a signal-to-interference ratio of the uplink channel, and an obtained slow fading value is a slow fading value of the signal-to-interference ratio, which is not limited in this embodiment.

In this embodiment, the uplink channel may include an uplink dedicated physical control channel DPCCH, an uplink enhanced dedicated physical control channel E-DPCCH, an uplink enhanced dedicated physical data channel E-DPDCH, or the like. For ease of description, an uplink data channel is used as an example in this embodiment, such as an E-DPDCH in a UMTS system, but is not limited thereto; or certainly, may be an uplink data channel in another communications system, such as an uplink data channel in an LTE system or a GSM system.

Slow fading, also referred to as shadow fading, is a loss caused by a shadow effect that is generated because a wave transmission path is blocked by a building or a mountain. Slow fading reflects a loss generated by an average value change of receive levels of several hundreds of wavelength orders of magnitude within a medium range, and generally follows logarithmic normal distribution. Reasons for generating slow fading are as follows:

(1) a path loss, which is a main reason for slow fading;

(2) a shadow area that is generated because an obstruction blocks an electromagnetic wave, and therefore, slow fading is also referred to as shadow fading; and (3) a weather change, a relative velocity between an obstruction and a mobile station, an operating frequency of an electromagnetic wave, and the like.

In this embodiment, mainly by means of slow power control, a change of a path loss (Pathloss) and a change of shadow fading (Shadow fading) are traced in the slow fading evaluation, so as to instruct the UE to adjust transmit power of the UE.

Step 102: Compare the slow fading value with a target slow fading value to obtain a first comparison result.

In this embodiment, the target slow fading value is obtained by means of outer loop power control by a network side device. The target slow fading value may be an average SIR value, or may be an average receive power value, which is not limited in this embodiment.

The comparing the slow fading value with the target slow fading value is equivalent to calculating a difference between the slow fading value and the target slow fading value, where the difference is the first comparison result.

In this embodiment, if a slow fading evaluation is performed on receive power in the foregoing step, a slow fading value is obtained. Then, whether a slow fading evaluation value is greater than the target slow fading value or less than the target slow fading value is determined by means of comparison. If the slow fading evaluation value is greater than the target slow fading value, transmit power on the uplink channel of the UE needs to be reduced. If the slow fading evaluation value is less than the target slow fading value, the transmit power on the uplink channel of the UE needs to be increased.

Certainly, in this embodiment, a slow fading evaluation may further be performed on the signal-to-interference ratio of the uplink channel. An implementation process is similar and is not described herein again.

Step 103: Generate first control signaling of a downlink control channel according to the first comparison result, where the first control signaling is used to instruct the UE to adjust transmit power of the UE on the uplink channel.

In this embodiment, the first control signaling may be a transmit power control command TPC.

In this step, the first control instruction is generated according to the difference, where the first control instruction is used to instruct the user equipment to adjust transmit power on the uplink channel, so that, for example, the UE selects, according to the received first control signaling, a transmit power control (TPC, Transmit Power Control) command used to adjust the uplink channel of the UE; and then adjusts the transmit power on the uplink channel according to the TPC command.

If slow fading is performed on the receive power in the foregoing step, when the slow fading evaluation value is greater than the target slow fading value, control signaling used to instruct the UE to reduce the transmit power on the uplink channel is generated; when the slow fading evaluation value is less than the target slow fading value, control signaling used to instruct the UE to increase the transmit power on the uplink channel is generated; and certainly, when the slow fading evaluation value is equal to the target slow fading value, control signaling used to instruct the UE not to adjust the transmit power on the uplink channel may be generated, that is, instruct the UE to keep in a current state.

Optionally, in this step, a first control signaling of a downlink channel corresponding to the uplink channel is generated according to the first comparison result, a first period for sending the first control signaling may further be generated. The first period is greater than a transmission time interval TTI, where the TTI is generally two seconds.

Step 104: Send the first control signaling to the UE.

When receiving the first control instruction, the UE adjusts the transmit power on the uplink channel according to the first control signaling. That is, within a next slot after the UE receives the first control signaling, a transmitter on the UE side adjusts transmit power that is output on the uplink channel within the next slot.

In this step, the network side device may send the first control signaling to the UE through a downlink control channel, where the downlink control channel may be a DPCCH, an F-DPCH, an E-DPCCH, an E-DCH absolute grant channel (E-AGCH, E-DCH Absolute Grant Channel), or the like; or certainly may be a newly established downlink control channel, which is not limited in this embodiment.

The E-AGCH is a physical control channel in an HSUPA technology in a TD-SCDMA system; and is used by an evolved NodeB NodeB to notify the UE of parameters related to an HSUPA traffic channel (E-PUCH), where the parameters mainly include power grant, code channel grant, timeslot grant (TRRI), a cyclic sequence number, and the like In this embodiment of the present invention, a slow fading evaluation is performed on an uplink channel of a UE. That is, the slow fading evaluation is introduced for uplink inner loop power control. Control signaling is generated by using a result of comparing a slow fading value obtained by means of the evaluation with a target slow fading value, where the control signaling is used to instruct the UE to adjust transmit power of the UE on the uplink channel, thereby making full use of power efficiency, improving a cell throughput, and reducing neighboring cell interference.

Figure 2:
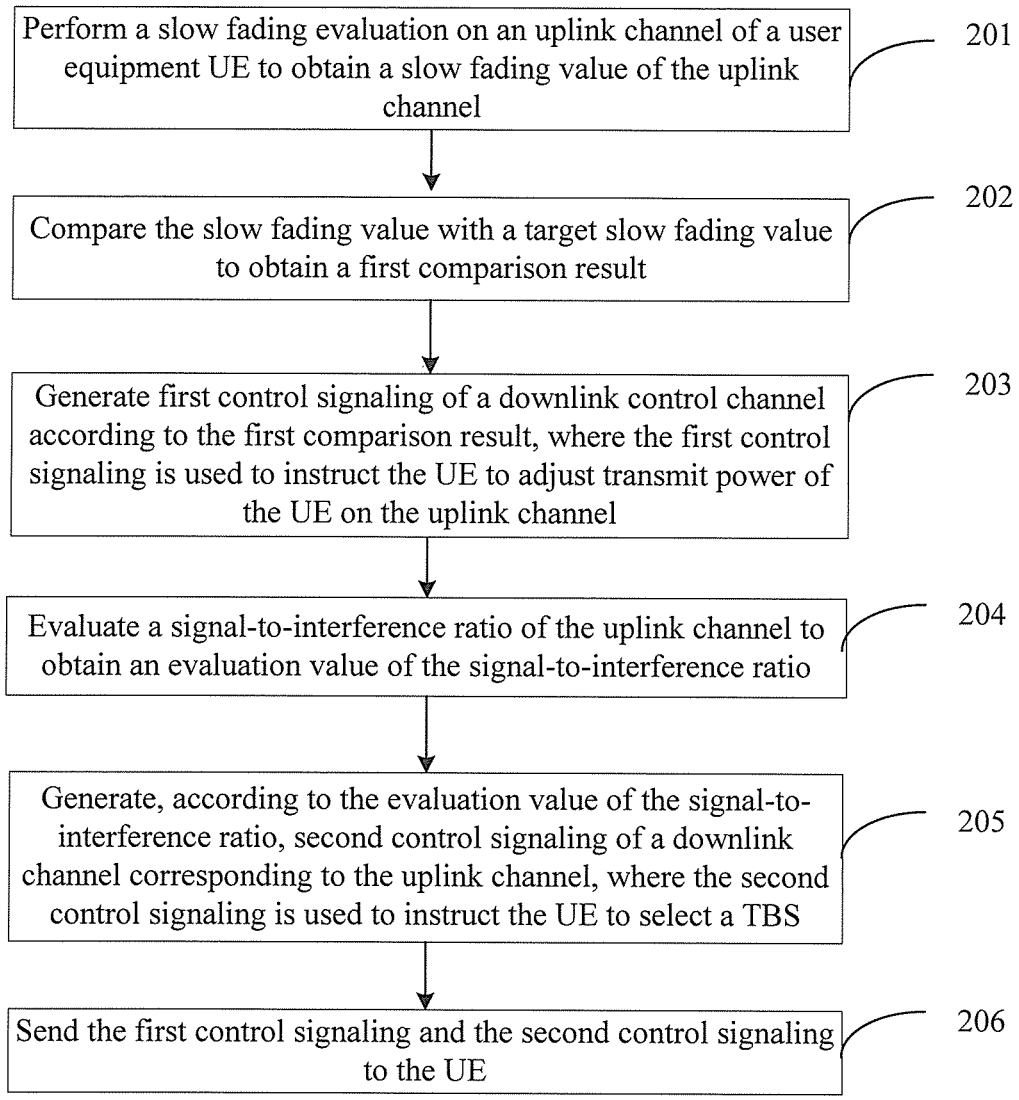
FIG. 2 is another flowchart of a power control method according to an embodiment of the present invention.

Further referring to FIG. 2, FIG. 2 is another flowchart of a power control method according to an embodiment of the present invention, where the power control method is applied to a network side device or another network element on a network side, such as a base station, and the method includes:

Step 201 to step 203: For details, refer to step 101 to step 103.

Step 204: Evaluate a signal-to-interference ratio of the uplink channel to obtain an evaluation value of the signal-to-interference ratio of the uplink channel.

A method for evaluating a signal-to-interference ratio of a channel is a technology well known by a person skilled in the art, and is not pointed out herein again.

Step 205: Generate second control signaling of the downlink channel according to the evaluation value of the signal-to-interference ratio, where the second control signaling is used to instruct the UE to select a TBS.

In this step, when the second control signaling is generated, a second period for sending the second control signaling may further be generated, where the second period is a TTI that is generally two seconds.

Step 206: Send the first control signaling and the second control signaling to the UE.

In this step, the network side device may first send the first control signaling and then send the second control signaling, or may simultaneously send the first control instruction and the second control instruction. However, it should be noted that, a period for sending the first control signaling is greater than a period for sending the second control instruction.

After receiving the first control signaling and the second control signaling, the UE adjusts the transmit power of the UE on the uplink channel according to the first control signaling; first selects a corresponding TBS according to the second control signaling, and then adjusts, according to the TBS, data sent by the UE on an uplink data channel, so as to instruct the UE to implement more precise scheduling.

In this embodiment, when receiving the second control instruction, the UE may search for a corresponding TBS from a stored correspondence between a control instruction and a TBS according to the second control instruction; and then, adjust, according to the TBS, the data sent on the uplink data channel.

Figure 2A:
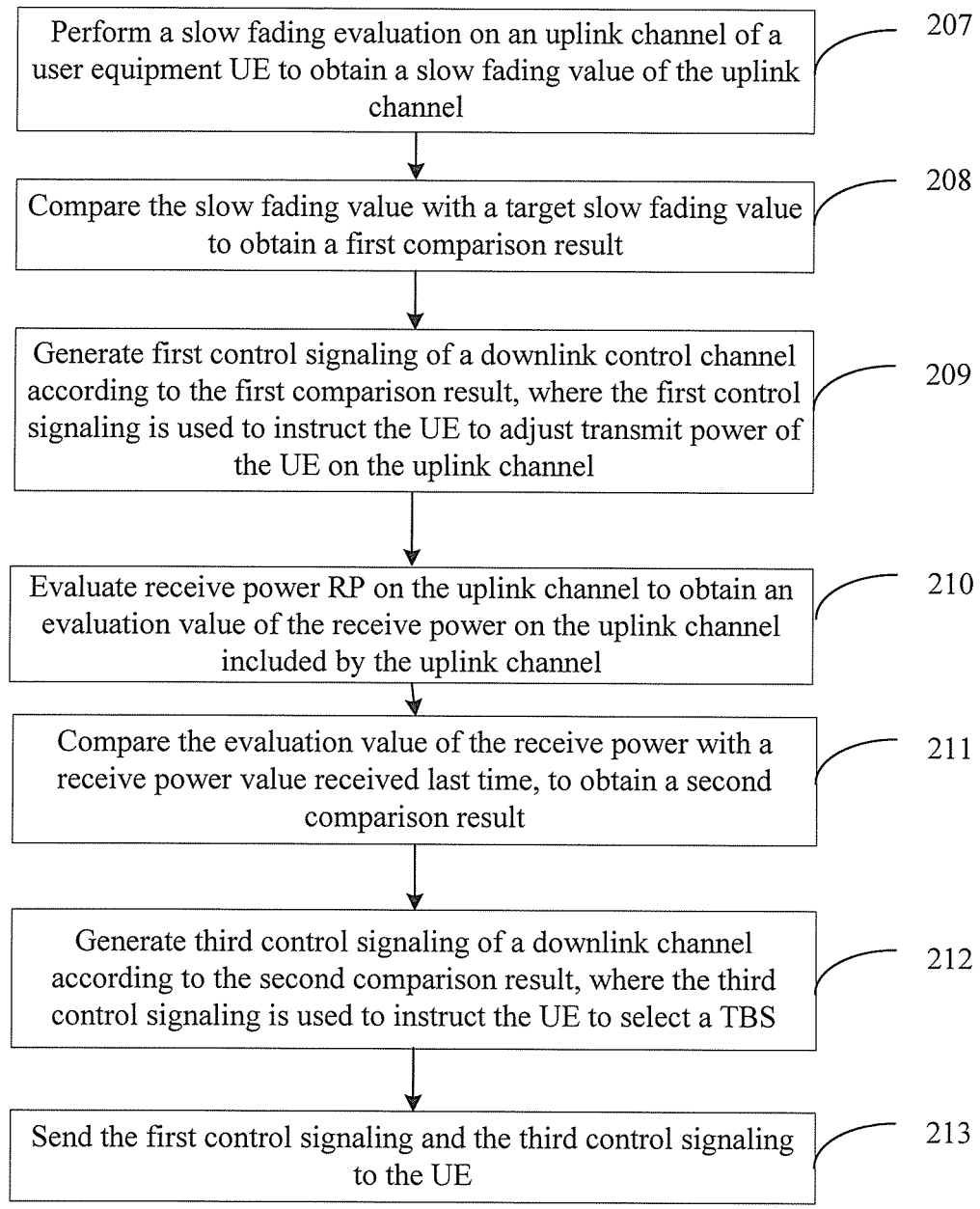
FIG. 2A is another flowchart of a power control method according to an embodiment of the present invention.

Further referring to FIG. 2A, FIG. 2A is another flowchart of a power control method according to an embodiment of the present invention, where the power control method is applied to a network side device or another network element on a network side, such as a base station, and the method includes:

Step 207 to step 209: For details, refer to step 101 to step 103.

Step 210: Evaluate receive power (RP, Received Power) on the uplink channel to obtain an evaluation value of the receive power on the uplink channel included by the uplink channel.

The receive power refers to receive power, which is obtained by adding all power on different code channels (Code), on a corresponding channel (one channel may correspond to multiple code channels).

Step 211: Compare the evaluation value of the receive power with a receive power value received last time, to obtain a second comparison result.

The comparing is equivalent to obtaining a difference between a current evaluation value of the receive power and an adjacent receive power value received last time, where the difference is the second comparison result; or certainly may be equivalent to calculating a difference between a current evaluation value of the receive power and an adjacent receive power value received before last time.

Step 212: Generate third control signaling of the downlink channel according to the second comparison result, where the third control signaling is used to instruct the UE to select the TBS.

Step 213: Send the first control signaling and the third control signaling to the UE.

In this embodiment, the first control signaling and the second control instruction may be simultaneously sent, or the first control instruction and the second control instruction may be sent sequentially, which is not limited in this embodiment.

In this step, after receiving the first control signaling and the third control signaling, the UE adjusts the transmit power of the UE on the uplink channel according to the first control signaling; first selects a corresponding transport block size TBS according to the third control signaling; and then adjusts, according to the TBS, data sent on the uplink channel. The first control signaling is used to adjust the transmit power on the uplink channel, and the third control signaling is used to select the TBS on the uplink channel.

In this embodiment of the present invention, a slow fading evaluation is first performed on an uplink channel. Then, whether a transport block size needs to be notified to the UE is determined, and when the transport block size needs to be notified to the UE, a second or third control instruction for selecting the TBS is generated. Afterward, first control signaling, and the second control instruction or the third control instruction are sent to the UE, so that the UE adjusts transmit power according to the first control signaling, selects the TBS according to the second or the third control instruction, and then adjusts sent uplink data according to the TBS. In this embodiment of the present invention, information used to instruct to select a TBS is sent to the UE, thereby enabling the UE to make full use of power efficiency, improve a cell throughput, and reduce neighboring cell interference, and further enabling the UE to implement more precise scheduling.

Optionally, in another embodiment, a difference between this embodiment and the foregoing embodiment lies in that, fast fading on the uplink control channel is traced to obtain a fast fading value of the uplink control channel, where the uplink channel includes the uplink control channel; then, the fast fading value is compared with a target fast fading value to obtain a third comparison result; a power control command TPC of a downlink control channel corresponding to the uplink control channel is generated according to the third comparison result, where the TPC is used to instruct the UE to adjust transmit power of the UE on the uplink control channel according to the TPC; and the transmit power control command TPC is sent to the user equipment UE.

In this embodiment, that the fast fading on the uplink control channel is traced may be that fast fading of receive power or a signal-to-interference ratio of the uplink control channel is traced. Then, a process of comparing the fast fading value with the target fast fading value is similar to the foregoing process of comparing the slow fading value with the target slow fading value. Reference is made to the foregoing description, and details are not described herein again.

Fast fading, also referred to as Rayleigh fading, is defined as: a rapid fluctuation phenomenon of a received signal that is caused by superposing, at a reception point, of multipath propagation signals due to a scatterer (a terrain, clutter, a moving object, or the like) nearby a mobile station.

Reasons for fast fading are as follows:

1. Multipath effect:

(1) Delay spread: A phenomenon that a pulse width of a received signal is extended due to a multipath effect (arrival time of different components of a same signal is different) is referred to as a delay spread. If the delay spread (a difference of time arrival between fastest and most slowly received multipath signals) is less than a code element period, intersymbol interference may be avoided; and if the delay spread is greater than one code element period (such as one chip in WCDMA), diversity reception and a balancing algorithm are required for receiving. (2) Correlation bandwidth: Fading of all frequency components in correlation bandwidth is consistent, that is, correlated, and distortion does not occur. If a carrier width is greater than correlated bandwidth, frequency selective fading is caused and a received signal is distorted.

2. Doppler effect: f frequency shift=V relative velocity/(C velocity of light/f frequency of an electromagnetic wave) *cos a (angle between an incident electromagnetic wave and a moving direction). The Doppler effect causes time-selective fading, that is, a frequency shift changes as a relative velocity changes. In this case, even though there is no multipath signal, time-selective fading is caused because a carrier range of a same channel of received signal changes as time changes. Interleaving may overcome time-selective fading.

It should be noted that, in mobile communications, fading is generated because a distance between a signal receiver and a signal transmitter constantly changes. Medians of a signal strength curve change slowly, which is referred to as slow fading; and instantaneous values of the curve change rapidly, which is referred to as fast fading. It can be learned that, fast fading and slow fading are not two types of independent fading (although reasons for generating them are different), where fast fading reflects an instantaneous value, and slow fading reflects a median obtained after weighted averaging has been performed on instantaneous values.

In this embodiment of the present invention, fast power control is performed on an uplink control channel (such as a DPCCH) in an inner loop; or slow power control may be performed on an uplink channel (such as a DPCCH, an E-DPDCH, or an E-DPCCH) in an inner loop; and two power loops are provided, where a power loop 1 controls power on the DPCCH, a power loop 2 controls power on the E-DPDCH, and a transmit frequency of the power loop 2 is lower than a transmit frequency of the power loop 1. In this embodiment of the present invention, a UE is instructed to make full use of power efficiency, improve a cell throughput, and reduce neighboring cell interference.

Figure 3:
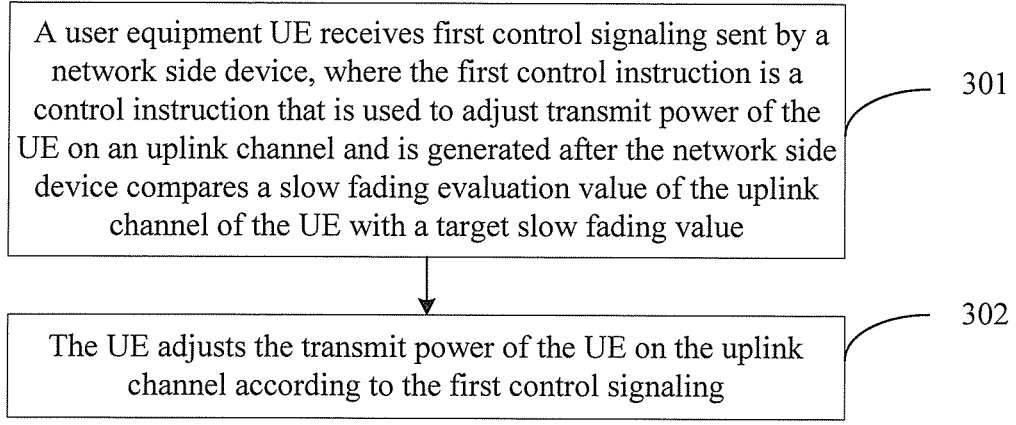
FIG. 3 is another flowchart of a power control method according to an embodiment of the present invention.

Further referring to FIG. 3, FIG. 3 is another flowchart of a power control method according to an embodiment of the present invention, where the method includes:

Step 301: A user equipment UE receives first control signaling sent by a network side device, where the first control instruction is a control instruction that is used to adjust transmit power of the UE on an uplink channel and is generated after the network side device compares a slow fading evaluation value of the uplink channel of the UE with a target slow fading value.

The uplink channel may include an uplink dedicated physical control channel DPCCH, an uplink enhanced dedicated physical control channel E-DPCCH, an uplink enhanced dedicated physical data channel E-DPDCH, or the like in a UMTS system; or certainly may be an uplink channel or the like in an LTE system or a GSM system.

In this step, the user equipment may receive, through an existing downlink control channel or a newly added downlink control channel, the first control signaling sent by the network side device, where the existing downlink control channel may include a DPCCH, an F-DPCH, an E-DPCCH, an E-DCH absolute grant channel (E-AGCH, E-DCH Absolute Grant Channel), and the like.

Step 302: The UE adjusts the transmit power of the UE on the uplink channel according to the first control signaling.

When receiving the first control signaling, the UE performs an operation, for example, adaptively increases or decreases the transmit power on the uplink channel according to the first control signaling within a next slot.

In this embodiment of the present invention, a slow fading evaluation is introduced for uplink inner loop power control. After receiving a control instruction sent by a network side device, a UE adjusts transmit power of the UE on an uplink channel according to the control signaling, thereby making full use of power efficiency, improving a cell throughput, and reducing neighboring cell interference.

Figure 4:
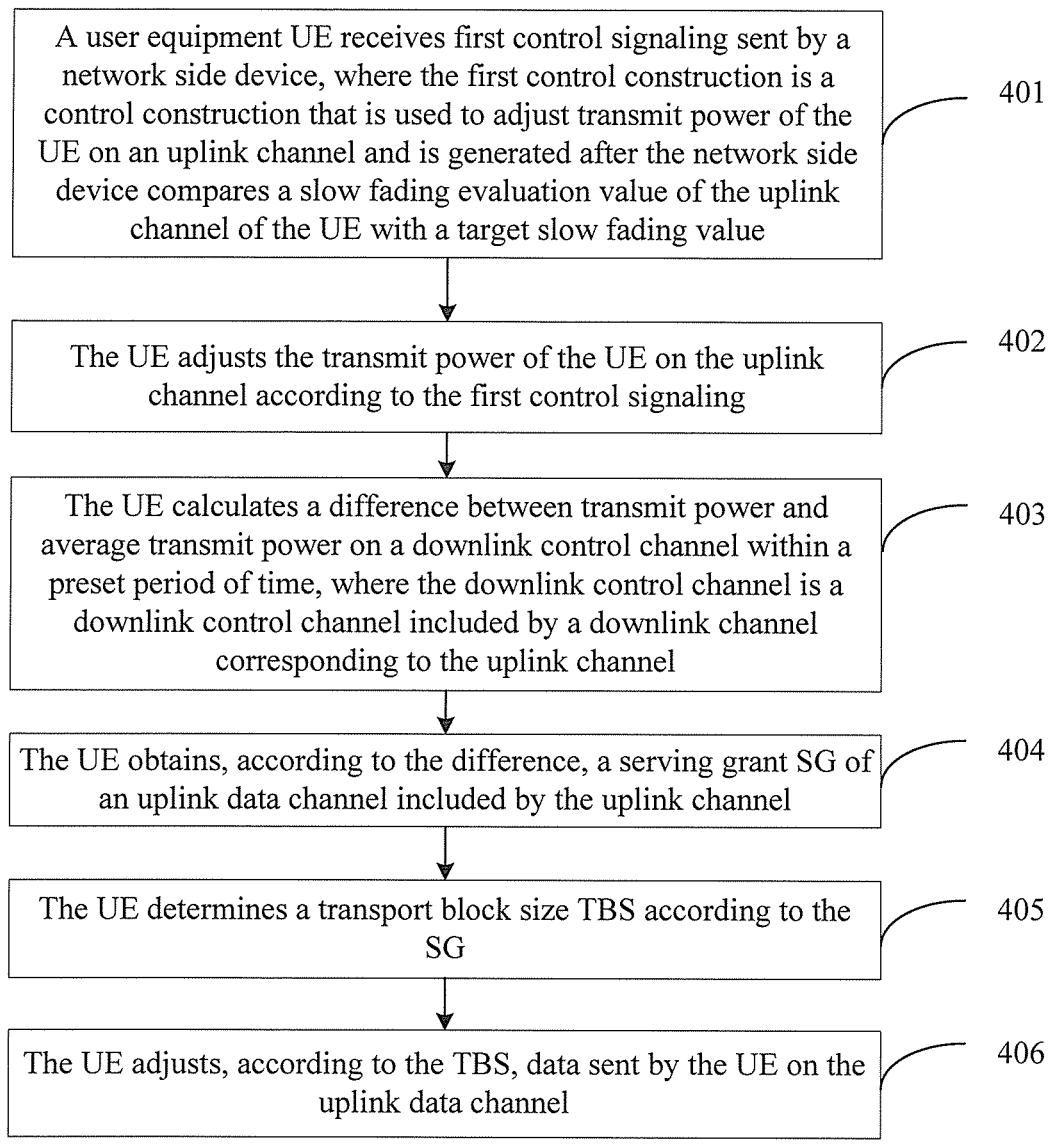
FIG. 4 is another flowchart of a power control method according to an embodiment of the present invention.

Further referring to FIG. 4, FIG. 4 is another flowchart of a power control method according to an embodiment of the present invention, where the method includes:

Step 401 to step 402: For details, refer to step 301 to step 302.

Step 403: The UE calculates a difference between transmit power and average transmit power on the downlink control channel within a preset period of time, where the downlink control channel is a downlink control channel included by a downlink channel corresponding to the uplink channel.

In this embodiment, the UE may acquire transmit power on a downlink control channel on a network side, or may estimate transmit power on a downlink control channel, which is not limited in this embodiment.

Step 404: The UE obtains, according to the difference, a serving grant SG of an uplink data channel included by the uplink channel.

Step 405: The UE determines a transport block size TBS according to the SG.

Step 406: The UE adjusts, according to the TBS, data sent by the UE on the uplink data channel.

For example, the user equipment calculates a difference between current power and average power on a DPCCH; obtains a serving grant/serving grant (SG, serving grant) of an E-DPDCH according to the difference; selects, based on the serving grant, a transport block size TBS; and then sends data on the uplink E-DPDCH according to the TBS.

In this embodiment of the present invention, a slow fading evaluation is introduced for uplink inner loop power control. When receiving a first control instruction sent by a network side device, a UE adjusts transmit power of the UE on the uplink channel according to the first control instruction; then determines a TBS; and adjusts, according to the TBS, data sent by the UE on the uplink data channel, thereby making full use of power efficiency, improving a cell throughput, reducing neighboring cell interference, and also improving scheduling precision.

Figure 5:
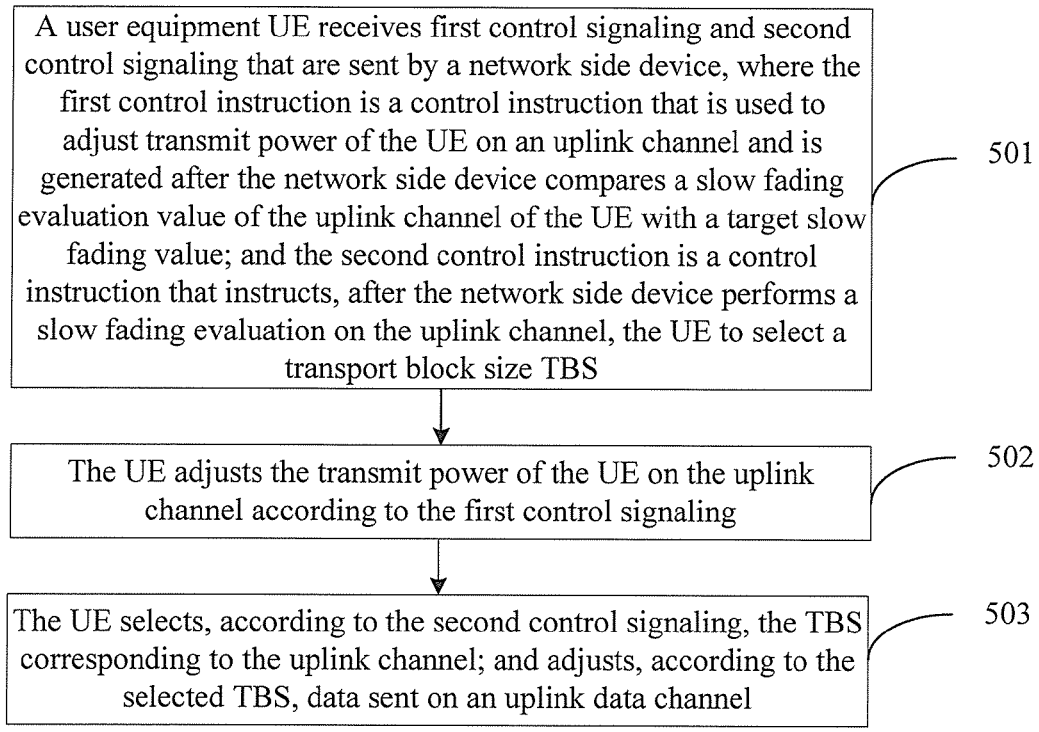
FIG. 5 is another flowchart of a power control method according to an embodiment of the present invention.

Further referring to FIG. 5, FIG. 5 is another flowchart of a power control method according to an embodiment of the present invention, where the method includes:

Step 501: A user equipment UE receives first control signaling and second control signaling that are sent by a network side device, where the first control instruction is a control instruction that is used to adjust transmit power of the UE on an uplink channel and is generated after the network side device compares a slow fading evaluation value of the uplink channel of the UE with a target slow fading value; and the second control instruction is a control instruction that instructs, after the network side device performs a slow fading evaluation on the uplink channel, the UE to select a transport block size TBS.

In this step, the user equipment receives, through a downlink control channel or a newly established downlink control channel, the first control signaling and the second control signaling that are sent by the network side device. The user equipment may simultaneously receive the first control signaling and the second control signaling, or may not simultaneously receive the first control instruction and the second control instruction. The first control instruction and the second control instruction may be carried in one signaling message, or may be separately carried in different signaling messages, which is not limited in this embodiment.

The uplink channel includes an uplink dedicated physical control channel DPCCH, an uplink enhanced dedicated physical control channel E-DPCCH, or an uplink enhanced dedicated physical data channel E-DPDCH.

Step 502: The UE adjusts the transmit power of the UE on the uplink channel according to the first control signaling.

Step 503: The UE selects, according to the second control signaling, the TBS corresponding to the uplink channel; and adjusts, according to the selected TBS, data sent on the uplink data channel.

In step 502 and step 503, the UE may adjust transmit power on the uplink data channel or an uplink control channel according to the first control signaling; select a proper TBS according to the second control signaling; and then adjust, according to the TBS, data sent by the UE on the uplink data channel or information sent on the uplink control channel.

It should be noted that, a sequence for performing step 502 and step 503 is not limited, and step 502 and step 503 may be performed concurrently, which is not limited in this embodiment.

In this embodiment of the present invention, a slow fading evaluation is introduced for uplink inner loop power control, and a path loss and shadow fading are traced by means of slow power control, thereby making full use of power efficiency, improving a cell throughput, and reducing neighboring cell interference.

The UE adjusts the transmit power of the UE on the uplink channel according to the received first control instruction; selects the TBS according to the received second control signaling; and then adjusts, according to the TBD, the data sent by the UE on the uplink data channel, thereby making full use of power efficiency, improving a cell throughput, reducing neighboring cell interference, and also improving scheduling precision.

Optionally, in another embodiment that is based on the foregoing embodiment, the method may further include: receiving a transmit power control command TPC sent by the network side device, where the TPC is a TPC that is used to adjust transmit power on an uplink control channel and is generated after the network side device compares a fast fading trace value of the uplink control channel with a target fast fading trace value; and then adjusting, by the UE according to the TPC, the transmit power on the uplink control channel included by the uplink channel, where the uplink channel includes the uplink control channel.

It should be noted that, in the foregoing embodiments, a slow fading evaluation is performed on an uplink channel in an inner loop, so as to implement inner loop power control. However, in this embodiment, fast fading on an uplink channel in an inner loop is traced, so as to implement inner loop power control. The fast fading trace and the slow fading evaluation are not two types of independent fading (although reasons for generating them are different), where the fast fading trace reflects an instantaneous value, and the slow fading evaluation reflects a median obtained after weighted averaging is performed on instantaneous values.

In this embodiment of the present invention, fast power control is performed on an uplink control channel (such as a DPCCH) in an inner loop, and slow power control is performed on an uplink channel (such as an uplink data channel E-DPDCH or an uplink control channel) in the inner loop, so that two power loops are implemented, where a power loop 1 controls power on the DPCCH or the like, a power loop 2 controls power on the E-DPDCH or the like, and a transmit frequency of the power loop 2 is lower than a transmit frequency of the power loop 1. In this way, power efficiency is fully used, a cell throughput is improved, neighboring cell interference is reduced, and scheduling precision of a UE is improved at the same time.

Figure 6:
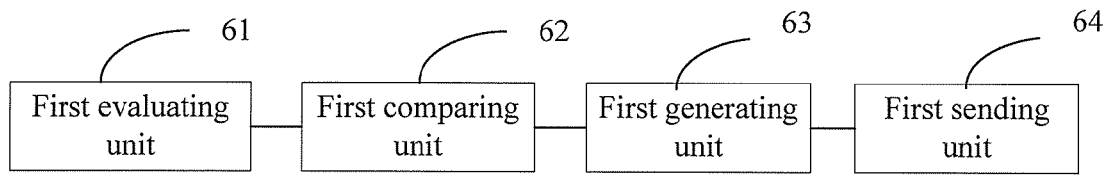
FIG. 6 is a schematic structural diagram of a power control apparatus according to an embodiment of the present invention.

Based on an implementation process of the foregoing method, an embodiment of the present invention further provides a power control apparatus, and a schematic structural diagram of the apparatus is shown in FIG. 6, where the apparatus includes: a first evaluating unit 61, a first comparing unit 62, a first generating unit 63, and a first sending unit 64.

The first evaluating unit 61 is configured to perform a slow fading evaluation on an uplink channel of a user equipment UE to obtain a slow fading value of the uplink channel, where the uplink channel includes an uplink dedicated physical control channel DPCCH, an uplink enhanced dedicated physical control channel E-DPCCH, or an uplink enhanced dedicated physical data channel E-DPDCH;

the first comparing unit 62 is configured to compare the slow fading value obtained by the first evaluating unit 61 with a target slow fading value to obtain a first comparison result;

the first generating unit 63 is configured to generate, according to the first comparison result obtained by the first comparing unit by means of comparison, first control signaling of a downlink channel corresponding to the uplink channel, where the first control signaling is used to instruct the UE to adjust transmit power on the uplink channel; and the first sending unit 64 is configured to send the first control signaling generated by the first generating unit 63 to the UE, so that the UE adjusts the transmit power on the uplink channel according to the first control signaling, where the first sending unit 64 may send the first control signaling through a downlink control channel, or may send the first control signaling through a newly established downlink control channel, which is not limited in this embodiment.

Figure 7:
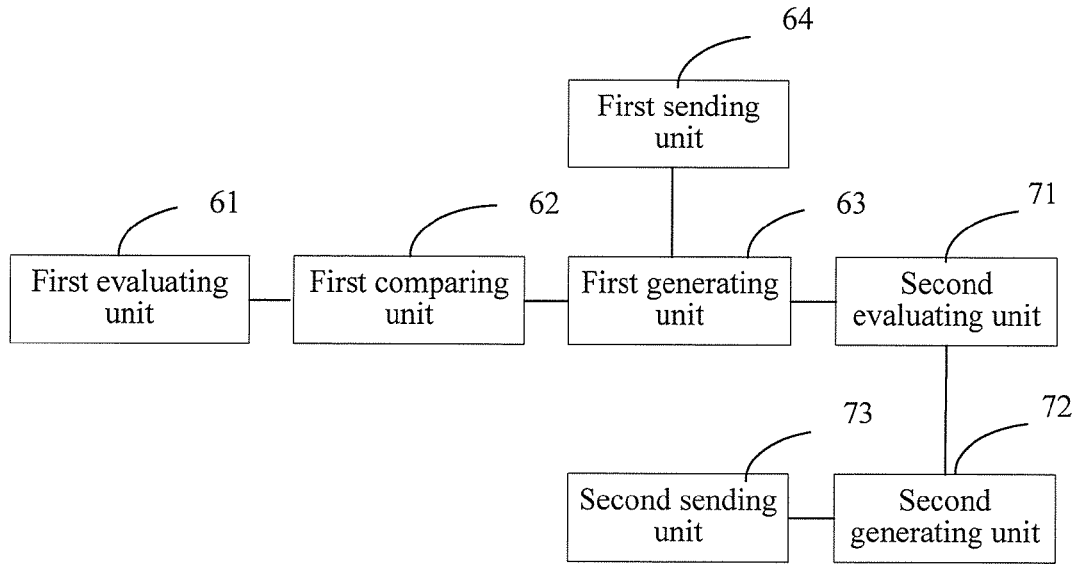
FIG. 7 is another schematic structural diagram of a power control apparatus according to an embodiment of the present invention.

Optionally, in another embodiment that is based on the foregoing embodiment, the apparatus may further include a second evaluating unit 71, a second generating unit 72, and a second sending unit 73; and a schematic structural diagram of the apparatus is shown in FIG. 7, where the second evaluating unit 71 is configured to: before or after the first generating unit 63 generates the first control signaling (a case that after the first control signaling is generated is used as an example in this embodiment), evaluate a signal-to-interference ratio of the uplink channel to obtain an evaluation value of the signal-to-interference ratio of the uplink channel;

the second generating unit 72 is configured to generate, according to the evaluation value of the signal-to-interference ratio that is obtained by the second evaluating unit 71, second control signaling of the downlink channel corresponding to the uplink channel, where the second control signaling is used to instruct the UE to select a transport block size TBS; and the second sending unit 73 is configured to send the second control signaling generated by the second generating unit 72 to the UE, so that the UE selects the TBS according to the second control signaling, and adjusts, according to the TBS, data sent by the UE on the uplink data channel.

Figure 7A:
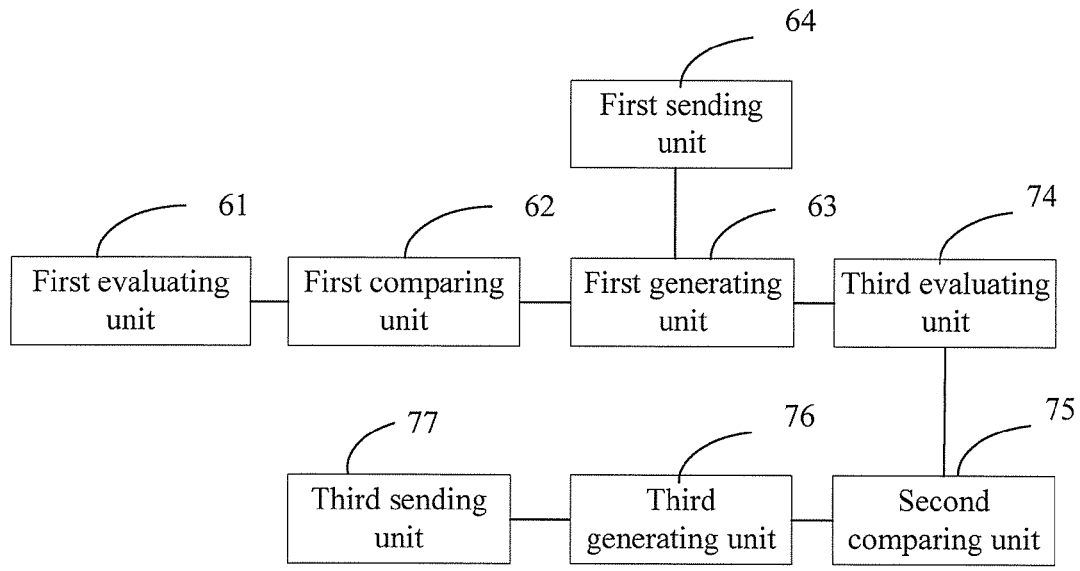
FIG. 7A is another schematic structural diagram of a power control apparatus according to an embodiment of the present invention.

Optionally, in another embodiment that is based on the foregoing embodiment, the apparatus may further include a third evaluating unit 74, a second comparing unit 75, a third generating unit 76, and a third sending unit 77; and a schematic structural diagram of the apparatus is shown in FIG. 7A, and FIG. 7A is based on FIG. 6 but is not limited thereto.

The third evaluating unit 74 is configured to: before or after the first generating unit 63 generates the first control signaling, evaluate receive power on the uplink channel to obtain an evaluation value of the receive power on the uplink channel;

the second comparing unit 75 is configured to compare the evaluation value of the receive power that is obtained by the third evaluating unit 74 by means of the evaluation with a receive power value received last time, to obtain a second comparison result;

the third generating unit 76 is configured to generate third control signaling of the downlink channel according to the second comparison result obtained by the second comparing unit 75, where the third control signaling is used to instruct the UE to select the TBS; and the third sending unit 77 is configured to send the third control signaling generated by the third generating unit 77 to the UE, so that the UE selects the TBS according to the third control signaling, and adjusts, according to the TBS, the data transmitted by the UE on the uplink data channel.

Figure 8:
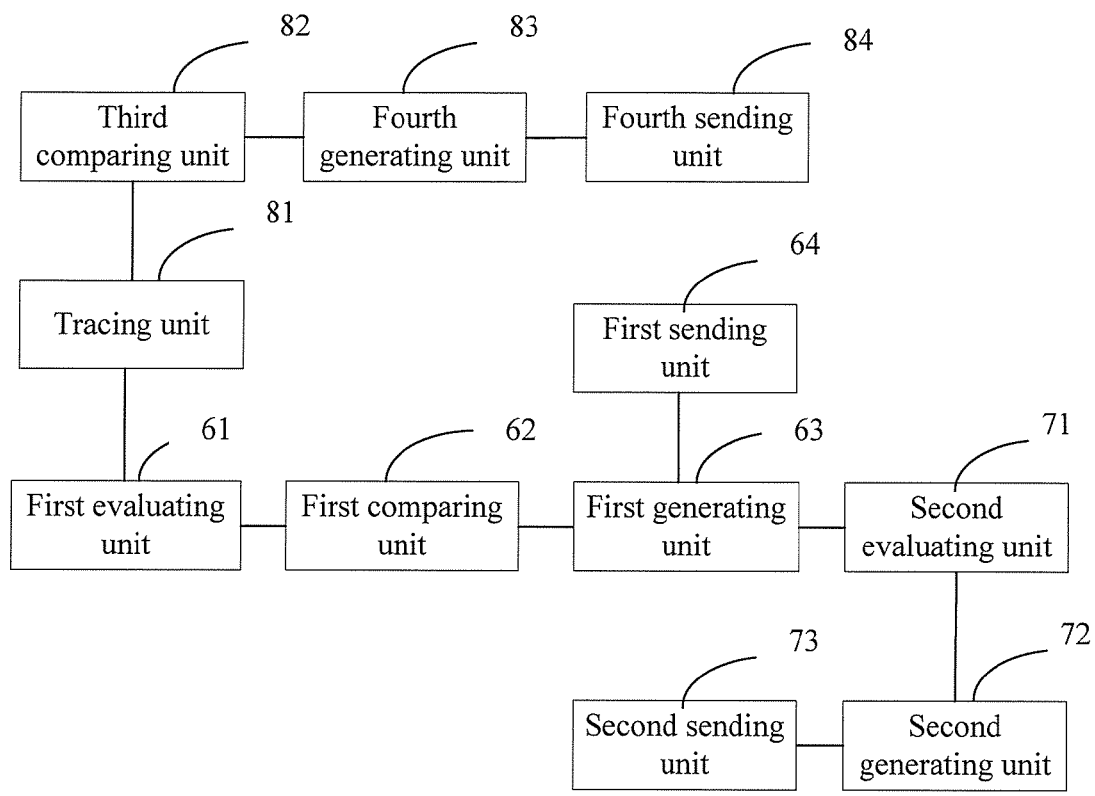
FIG. 8 is another schematic structural diagram of a power control apparatus according to an embodiment of the present invention.

Optionally, in another embodiment that is based on all the foregoing embodiments, the apparatus may further include a tracing unit 81, a third comparing unit 82, a fourth generating unit 83, and a fourth sending unit 84; and a schematic structural diagram of the apparatus is shown in FIG. 8, and FIG. 8 uses FIG. 7 as an example but is not limited thereto, or may use FIG. 7A or FIG. 6 as an example.

The tracing unit 81 is configured to: when the first evaluating unit 61 performs the slow fading evaluation on the uplink channel, trace fast fading on an uplink control channel included by the uplink channel, to obtain a fast fading value of the uplink control channel;

the third comparing unit 82 is configured to compare the fast fading value obtained by the tracing unit 81 with a target fast fading value to obtain a third comparison result;

the fourth generating unit 83 is configured to generate, according to the third comparison result obtained by the third comparing unit 82, a power control command TPC of a downlink control channel corresponding to the uplink control channel, where the TPC is used to instruct the UE to adjust transmit power on the uplink control channel according to the TPC; and the fourth sending unit 84 is configured to send the TPC generated by the fourth generating unit 83 to the UE, so that the UE adjusts the transmit power on the uplink control channel according to the transmit power control command TPC.

It should be noted that, the tracing unit 81, the third comparing unit 82, the fourth generating unit 83, and the fourth sending unit 84 in this embodiment perform a fast trace on an uplink control channel in an inner loop, while in the foregoing embodiments, a slow fading evaluation is performed on an uplink control channel and/or an uplink channel in an inner loop. The two processes may be performed simultaneously or may not be performed simultaneously, which is not limited in this embodiment.

For a specific function and an implementation process of each unit in the apparatus, refer to an implementation process of a corresponding step in the foregoing method, and details are not described herein again.

Figure 9:
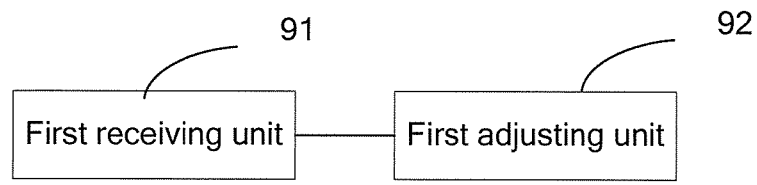
FIG. 9 is another schematic structural diagram of a power control apparatus according to an embodiment of the present invention.

Further referring to FIG. 9, FIG. 9 is another schematic structural diagram of a power control apparatus according to an embodiment of the present invention, where the apparatus includes a first receiving unit 91 and a first adjusting unit 92, where the first receiving unit 91 is configured to receive first control signaling sent by a network side device, where the first control instruction is a control instruction that is used to adjust transmit power on an uplink channel and is generated after the network side device compares a slow fading evaluation value of the uplink channel of the UE with a target slow fading value; and the first adjusting unit 92 is configured to adjust the transmit power of the UE on the uplink channel according to the first control signaling received by the first receiving unit 91, where the uplink channel adjusted by the first adjusting unit includes an uplink dedicated physical control channel DPCCH, an uplink enhanced dedicated physical control channel E-DPCCH, or an uplink enhanced dedicated physical data channel E-DPDCH.

Figure 10:
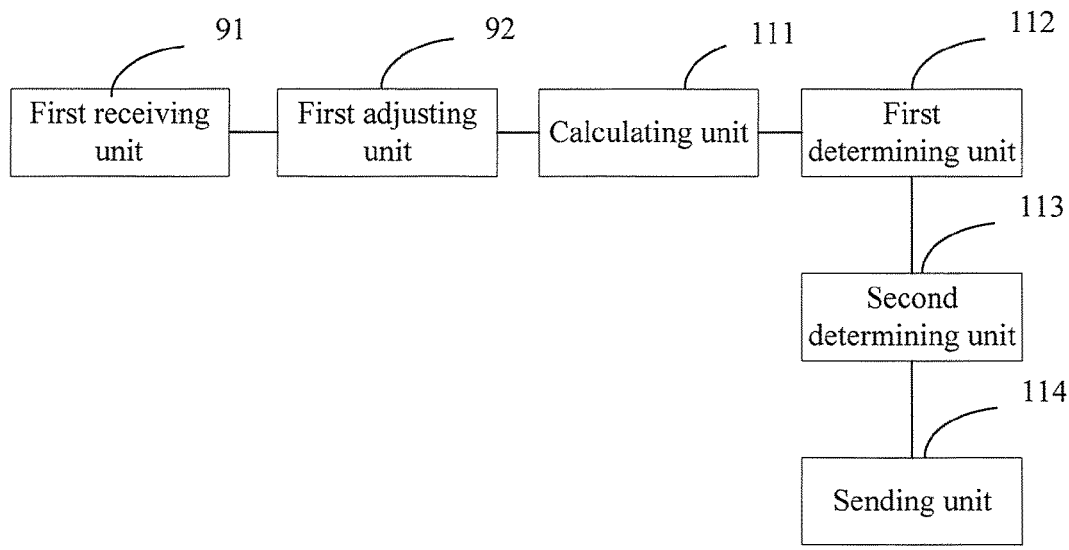
FIG. 10 is another schematic structural diagram of a power control apparatus according to an embodiment of the present invention.

Optionally, in another embodiment that is based on the embodiment shown in FIG. 9, the apparatus may further include a calculating unit 111, a first determining unit 112, a second determining unit 113, and a sending unit 114; and a schematic structural diagram of the apparatus is shown in FIG. 10.

The calculating unit 111 is configured to: after the first adjusting unit 92 adjusts the transmit power on the uplink channel, calculate a difference between transmit power and average transmit power on the downlink control channel within a preset period of time, where the downlink control channel is a downlink control channel included by a downlink channel corresponding to the uplink channel;

the first determining unit 112 is configured to obtain, according to the difference obtained by the calculating unit 111 by means of calculation, a serving grant SG of an uplink data channel included by the uplink channel;

the second determining unit 113 is configured to determine a transport block size TBS according to the SG determined by the first determining unit 112; and the sending unit 114 is configured to send data on the uplink data channel according to the TBS determined by the second determining unit 113.

Figure 11:
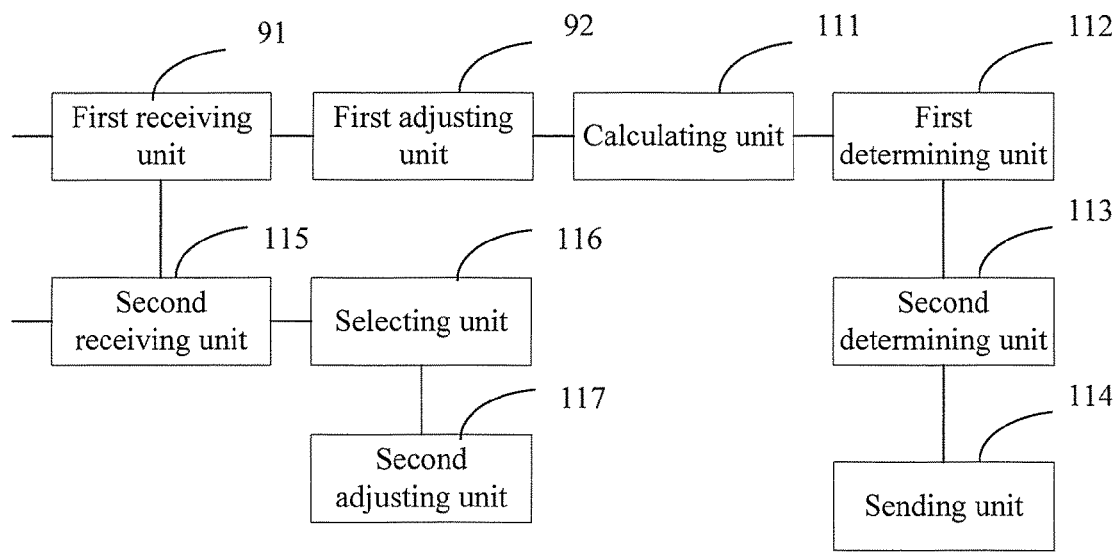
FIG. 11 is another schematic structural diagram of a power control apparatus according to an embodiment of the present invention.

Optionally, in another embodiment, an example that this embodiment is based on the embodiment shown in FIG. 10 is used. The apparatus may further include a second receiving unit 115, a selecting unit 116, and a second adjusting unit 117; and a schematic structural diagram of the apparatus is shown in FIG. 11.

The second receiving unit 115 is configured to receive second control signaling sent by the network side device, where the second control instruction is a control instruction that instructs, after the network side device performs a slow fading evaluation on the uplink channel, the UE to select a transport block size TBS.

In this embodiment, the UE may receive the second control signaling before or after receiving the first control signaling, or may simultaneously receive the first control signaling and the second control signaling, which is not limited in this embodiment.

The selecting unit 116 is configured to select the TBS on the uplink channel according to the second control signaling received by the second receiving unit 115.

The second adjusting unit 117 is configured to adjust, according to the TBS selected by the selecting unit 116, the data sent on the uplink data channel, where the uplink channel adjusted by the second adjusting unit includes an uplink dedicated physical control channel DPCCH, an uplink enhanced dedicated physical control channel E-DPCCH, or an uplink enhanced dedicated physical data channel E-DPDCH.

It should be noted that, in the foregoing embodiments, the first receiving unit and the second receiving unit may be integrated together, or may be deployed independently; and the first adjusting unit and the second adjusting unit may be integrated together, or may be deployed independently, which is not limited in this embodiment.

Figure 12:
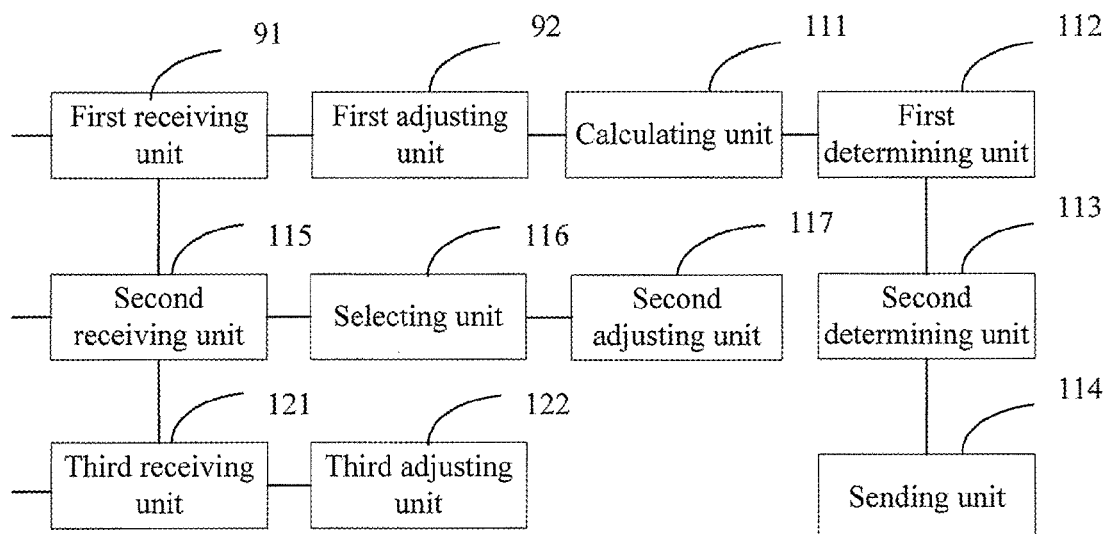
FIG. 12 is another schematic structural diagram of a power control apparatus according to an embodiment of the present invention.

Optionally, in another embodiment, an example that this embodiment is based on the embodiment shown FIG. 11 is used. The apparatus may further include a third receiving unit 121 and a third adjusting unit 122; and a schematic structural diagram of the apparatus is shown in FIG. 12.

The third receiving unit 121 is configured to receive a transmit power control command TPC sent by the network side device, where the TPC is a TPC that is used to adjust transmit power on an uplink control channel and is generated after the network side device compares a fast fading trace value of the uplink control channel included by the uplink channel with a target fast fading trace value.

Optionally, third control signaling is received before or after the first control signaling is received, or the third control signaling may be received when the first control signaling is received.

The third adjusting unit 122 is configured to adjust the transmit power on the uplink control channel according to the transmit power control command TPC received by the third receiving unit 121.

For a specific function and an implementation process of each unit in the apparatus, refer to an implementation process of a corresponding step in the foregoing method, and details are not described herein again.

Figure 13:
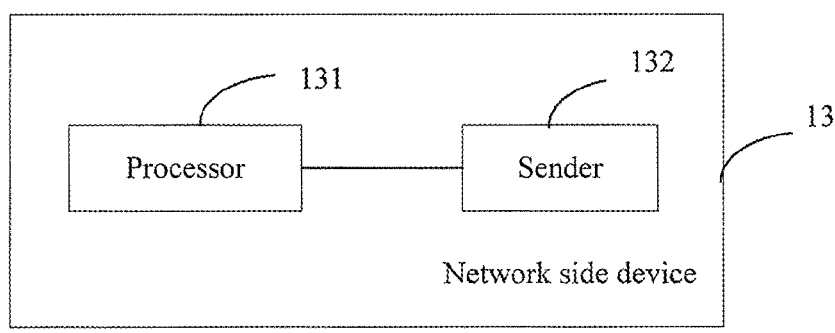
FIG. 13 is a schematic structural diagram of a network side device according to an embodiment of the present invention.

Further referring to FIG. 13, FIG. 13 is a schematic structural diagram of a network side device according to an embodiment of the present invention, where the network side device 13 includes a processor 131 and a sender 132, where the processor 131 is configured to: perform a slow fading evaluation on an uplink channel of a user equipment UE to obtain a slow fading value of the uplink channel; compare the slow fading value with a target slow fading value to obtain a first comparison result; and generate, according to the first comparison result, first control signaling of a downlink channel corresponding to the uplink channel, where the first control signaling is used to instruct the UE to adjust transmit power of the UE on the uplink channel;

the sender 132 is configured to send the first control signaling generated by the processor 131 to the UE, so that the UE adjusts transmit power on a corresponding uplink channel according to the first control signaling;

the processor 131 is further configured to: evaluate a signal-to-interference ratio of the uplink channel to obtain an evaluation value of the signal-to-interference ratio of the uplink channel, and generate second control signaling of the downlink channel according to the evaluation value of the signal-to-interference ratio, where the second control signaling is used to instruct the UE to select a transport block size TBS; or evaluate receive power on the uplink channel to obtain an evaluation value of the receive power on the uplink channel, compare the evaluation value of the receive power with a receive power value received last time, to obtain a second comparison result, and generate third control signaling of the downlink channel according to the second comparison result, where the second control signaling is used to instruct the UE to select a TBS; and the sender 132 is further configured to send the second control signaling or the second control signaling that is generated by the processor 131 to the UE, so that the UE adjusts the transmit power on the uplink channel according to the second control signaling or the third control signaling.

The uplink channel on which the processor 131 performs the slow fading evaluation includes an uplink dedicated physical control channel DPCCH, an uplink enhanced dedicated physical control channel E-DPCCH, or an uplink enhanced dedicated physical data channel E-DPDCH.

Optionally, the processor 131 is further configured to: trace fast fading on an uplink control channel included by the uplink channel, to obtain a fast fading value of the uplink control channel; compare the fast fading value with a target fast fading value to obtain a third comparison result; and generate, according to the third comparison result, a power control command TPC of a downlink control channel corresponding to the uplink control channel, where the TPC is used to instruct the UE to adjust transmit power of the UE on the uplink control channel according to the TPC; and the sender 132 is further configured to send the TPC generated by the processor 131 to the UE, so that the UE adjusts the transmit power on the uplink control channel according to the transmit power control command TPC.

For an implementation process of functions of the processor and the sender in the network side device, refer to an implementation process of a corresponding step in the foregoing method, and details are not described herein again.

Figure 14:
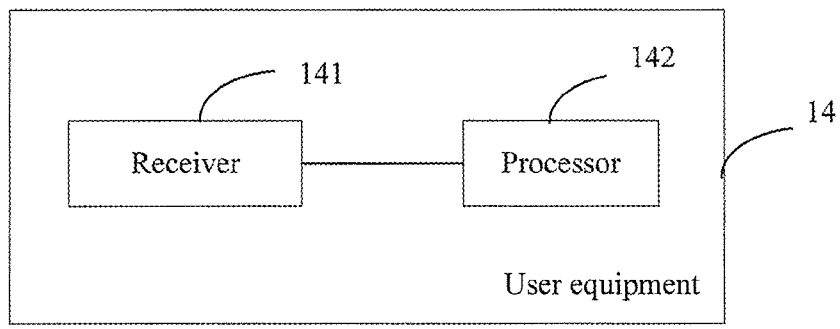
FIG. 14 is a schematic structural diagram of a user equipment according to an embodiment of the present invention.

Further referring to FIG. 14, FIG. 14 is a schematic structural diagram of a user equipment according to an embodiment of the present invention, where the user equipment 14 includes a receiver 141 and a processor 142, where the receiver 141 is configured to receive first control signaling sent by a network side device, where the first control instruction is a control instruction that is used to adjust transmit power of the UE on an uplink channel and is generated after the network side device compares a slow fading evaluation value of the uplink channel of the UE with a target slow fading value; and the processor 142 is configured to adjust the transmit power of the UE on the uplink channel according to the first control signaling received by the receiver 141.

Optionally, the processor 142 is further configured to: after the transmit power on the uplink channel is adjusted according to the first control signaling received by the receiver 141, calculate a difference between transmit power and average transmit power on a downlink control channel within a preset period of time, where the downlink control channel is a downlink control channel included by a downlink channel corresponding to the uplink channel; obtain, according to the difference, a serving grant SG of an uplink data channel included by the uplink channel; and determine a transport block size TBS according to the SG, where the uplink channel includes the uplink data channel; and the processor 142 is further configured to adjust, according to the determined TBS, data sent by the UE on the uplink data channel.

Optionally, the following may further be included: the receiver 141 is further configured to receive second control signaling sent by the network side device, where the second control instruction is a control instruction that instructs, after the network side device performs a slow fading evaluation on the uplink channel, the UE to select a transport block size TBS; and the processor 142 is further configured to select, according to the second control signaling received by the receiver 141, the TBS corresponding to the uplink channel; and adjust, according to the selected TBS, the data sent on the uplink data channel, where the uplink channel adjusted by the processor 142 includes an uplink dedicated physical control channel DPCCH, an uplink enhanced dedicated physical control channel E-DPCCH, or an uplink enhanced dedicated physical data channel E-DPDCH.

Optionally, the receiver 141 is further configured to receive a transmit power control command TPC sent by the network side device, where the TPC is a TPC that is used to adjust transmit power on an uplink control channel and is generated after the network side device compares a fast fading trace value of the uplink control channel with a target fast fading trace value; and the processor 142 is further configured to adjust, according to the TPC received by the receiver 141, the transmit power on the uplink control channel included by the uplink channel, where the uplink channel includes the uplink control channel.

For an implementation process of functions of the processor and the sender in the user equipment, refer to an implementation process of a corresponding step in the foregoing method, and details are not described herein again.

Figure 15:
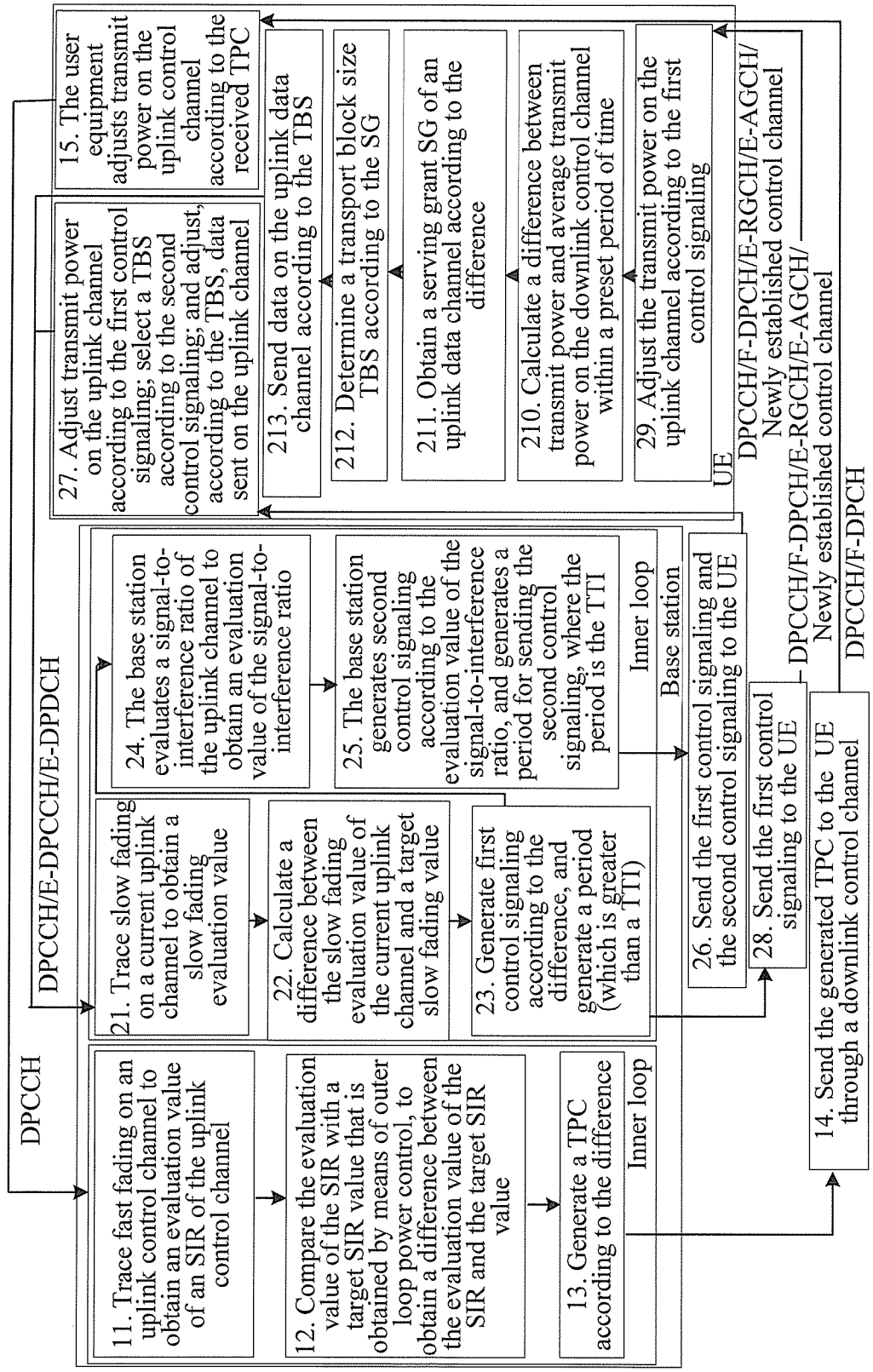
FIG. 15 is an application example diagram of a power control method according to an embodiment of the present invention.

Further referring to FIG. 15, FIG. 15 is an application example diagram of a power control method according to an embodiment of the present invention. In this embodiment, that a network side device is a base station and a user equipment is a UE is used as an example, and inner loop power control is used as an example.

As shown in the figure, for an uplink control channel in an inner loop, the method includes:

Step 11: A base station traces fast fading of a SIR of an uplink control channel to obtain a fast fading evaluation value of the SIR of the uplink control channel.

Certainly, in this embodiment, fast fading of a signal-to-interference ratio or receive power of the uplink control channel may be traced, and the signal-to-interference ratio is used as an example in this embodiment.

Step 12: The base station compares the fast fading evaluation value of the SIR with a target SIR value that is obtained by means of outer loop power control, to obtain a difference between the fast fading evaluation value of the SIR and the target SIR value.

Step 13: The base station generates a TPC according to the difference.

Step 14: The base station sends the generated TPC to a user equipment through a downlink control channel.

A sending manner may be that the TPC is sent in each slot (Slot), where three Slots are equal to one TTI and each TTI is two seconds, which is not limited thereto.

The downlink control channel may be a DPCCH, an F-DPCH, an E-DPCCH, an E-AGCH, or the like, and certainly may be a newly established downlink control channel, which is not limited in this embodiment.

Step 15: The user equipment adjusts transmit power on the uplink control channel according to the received TPC.

For an uplink channel in the inner loop, the method includes:

Step 21: The base station traces slow fading of current uplink channel to obtain a slow fading evaluation value (that is, a first fading evaluation value).

The uplink channel of which the slow fading is traced may be a DPCCH, an E-DPCCH, or an E-DPDCH in a UMTS system; or certainly may be an uplink control channel or an uplink data channel in another communications system, which is not limited in this embodiment.

In this embodiment, slow fading of a signal-to-interference ratio or receive power of the uplink channel may be traced.

Step 22: The base station acquires a target slow fading value, and calculates a difference between the slow fading evaluation value of the current uplink channel and the target slow fading value.

Step 23: The base station generates first control signaling of a downlink channel according to the difference, and generates a period for sending the first control signaling, where the period is greater than a transmission time interval TT1, and the first control signaling is used to instruct the UE to select a TPC.

It should be noted that, in step 21 to step 23 in this embodiment, a slow fading evaluation may be an evaluation performed on the receive power, or may be an evaluation performed on the signal-to-interference ratio; and an obtained evaluation value is compared with its average value (that is, a corresponding target value) of the receive power and the signal-to-interference ratio, and corresponding first control signaling is generated according to a comparison result. In this embodiment, the receive power is preferably selected as an evaluation manner of slow fading.

Then, step 24 to step 27 are performed, or step 28 to step 213 are performed.

Step 24: The base station evaluates a signal-to-interference ratio of the uplink channel to obtain an evaluation value of the signal-to-interference ratio.

Step 25: The base station generates second control signaling of the downlink channel according to the evaluation value of the signal-to-interference ratio, and generates a period for sending the second control signaling, where the period is the TTI.

The second control signaling is used to instruct the UE to select a corresponding transport block size TBS.

In this embodiment, the step of generating, when the second control signaling is generated, the period for sending the second control signaling is optional.

It should be noted that, in this embodiment, a manner for selecting the TBS may be determined by evaluating the signal-to-interference ratio, or may be determined by evaluating the receive power. In this embodiment, evaluating the receive power is used as an example to determine the manner for selecting the TBS.

Step 26: The base station sends the first control signaling and the second control signaling to the user equipment UE.

In this embodiment, the base station may send the first control signaling and the second control signaling through an existing downlink control channel (such as a DPCCH, an F-DPCH, an E-RGCH, or an E-AGCH), or may send the first control signaling and the second control instruction through a newly established downlink control channel.

Optionally, the first control signaling and the second control signaling may be sent based on that the period is the TTI.

It should be noted that, the first control signaling and the second control signaling may be simultaneously sent, or may not be simultaneously sent, which is not limited in this embodiment.

Step 27: The UE adjusts transmit power on the uplink channel according to the first control signaling; selects, according to the second control signaling, the TBS corresponding to the uplink channel; and adjusts, according to the selected TBS, data sent on the uplink channel.

Step 28: The base station sends the first control signaling to the user equipment UE.

A sending manner may be sending the first control signaling through a downlink control channel, or may be sending the first control signaling through a newly established downlink control channel, which is not limited in this embodiment.

Step 29: The UE adjusts the transmit power on the uplink channel (which may be an uplink control channel, may be an uplink data channel, or the like) according to the received first control signaling.

Step 210: The UE calculates a difference between transmit power and average transmit power on the downlink control channel within a preset period of time.

Step 211: The UE obtains a serving grant SG of an uplink data channel according to the difference.

Step 212: The UE determines a transport block size TBS according to the SG.

Step 213: The UE sends data on the uplink data channel according to the TBS.

In this embodiment, after control signaling is generated, a TBS needs to be determined, where the TBS may be determined by a base station, or may be determined by a UE. Therefore, if the TBS is determined by the base station, the base station needs to notify the UE of the determined TBS, so that the UE adjusts, according to the TBS, data or information sent on an uplink channel; and if the TBS is determined by the UE, that is, the UE needs to calculate the TBS after adjusting transmit power on an uplink channel, and then sends data or information on the uplink channel according to the TBS.

In this embodiment of the present invention, fast power control is performed on an uplink control channel (such as a DPCCH) in an inner loop, and slow power control is performed on an uplink channel (such as an uplink data channel E-DPDCH or an uplink control channel) in the inner loop, so that two power loops are implemented, where a power loop 1 controls power on the DPCCH or the like, a power loop 2 controls power on the E-DPDCH or the like, and a transmit frequency of the power loop 2 is lower than a transmit frequency of the power loop 1. In this way, power efficiency is fully used, a cell throughput is improved, neighboring cell interference is reduced, and scheduling precision of a UE is improved at the same time.

Figure 16:
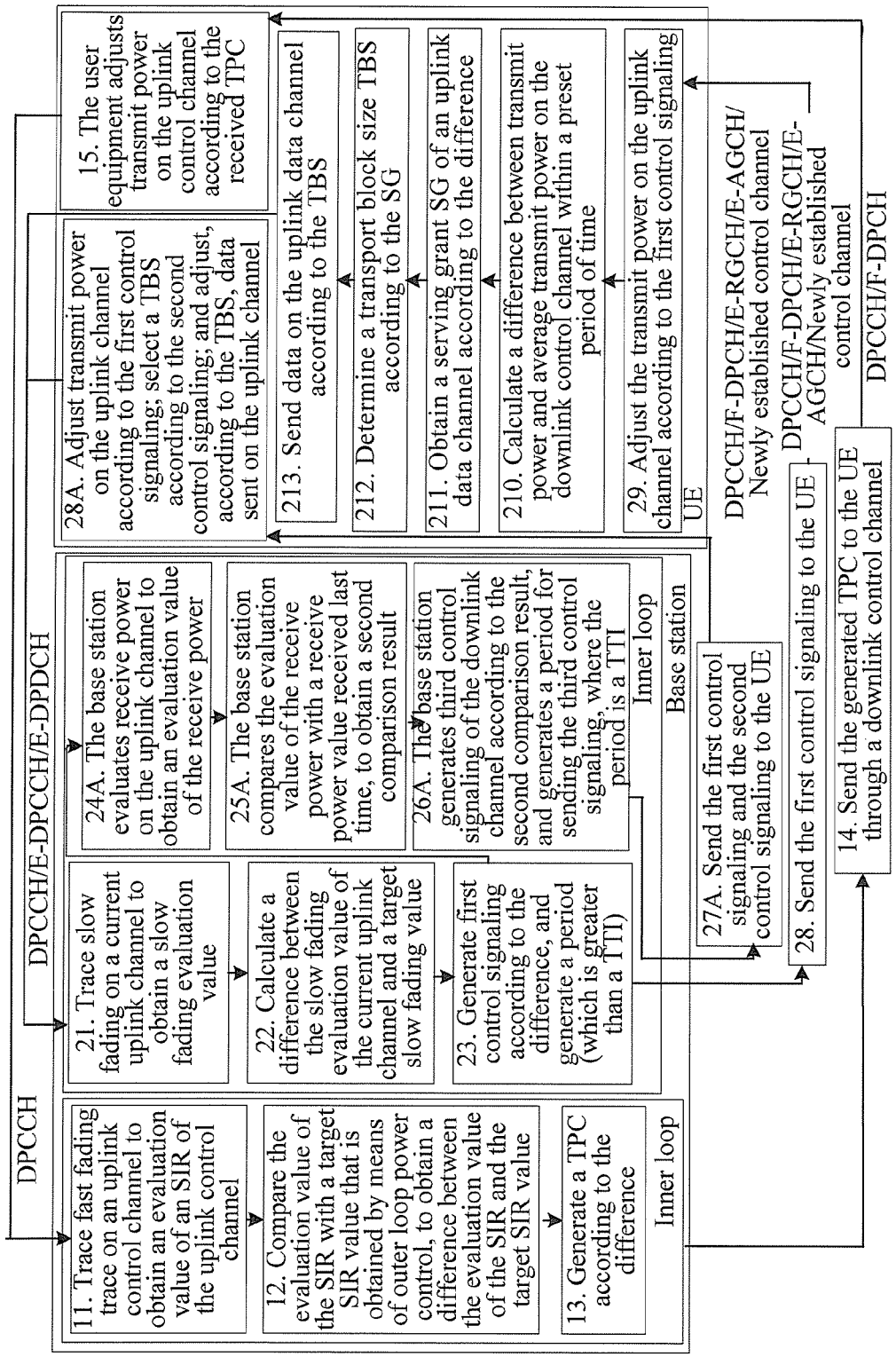
FIG. 16 is another application example diagram of a power control method according to an embodiment of the present invention.

Further referring to FIG. 16, FIG. 16 is another application example diagram of a power control method according to an embodiment of the present invention. A difference between this embodiment and the embodiment shown in FIG. 15 lies in that, selecting of a transport block size TBS is determined by evaluating receive power on an uplink channel, where the method specifically includes:

Three steps from step 24 to step 27 are replaced with four steps from step 24A to step 28A, which specifically include:

Step 24A: The base station evaluates receive power of the uplink channel to obtain an evaluation value of the receive power.

Evaluating the receive power on the uplink channel is used as an example in this embodiment, but this embodiment is not limited thereto; and a signal-to-interference ratio of the uplink channel may also be evaluated.

Step 25A: The base station compares the evaluation value of the receive power with a receive power value received last time, to obtain a second comparison result.

Step 26A: The base station generates third control signaling of the downlink channel according to the second comparison result, and generates a period for sending the third control signaling, where the period is a TTI.

Generating, when the third control signaling is generated, the period for sending the third control signaling is optional, where the third control signaling is used to instruct the UE to select a TBS.

It should be noted that, in this embodiment, a manner for selecting the TBS may be determined by evaluating the signal-to-interference ratio, or may be determined by evaluating the receive power. In this embodiment, evaluating the receive power is used as an example to determine the manner for selecting the TBS.

Step 27A: The base station sends the first control signaling and the third control signaling to the user equipment UE.

In this embodiment, the base station may send the first control signaling and the third control signaling through an existing downlink control channel (such as a DPCCH, an F-DPCH, an E-RGCH, or an E-AGCH), or may send the first control signaling and the third control instruction through a newly established downlink control channel.

Optionally, the first control signaling and the third control signaling may be sent based on that the period is the TTI.

It should be noted that, the first control signaling and the third control signaling may be simultaneously sent, or may not be simultaneously sent, which is not limited in this embodiment.

Step 28A: The UE adjusts transmit power on the uplink channel according to the first control signaling; selects the TBS according to the third control signaling; and adjusts transmit power on the uplink data channel according to the selected TBS.

Specifically, in this step, the UE may adjust the transmit power on the uplink channel according to the first control signaling; then select a corresponding TBS according to the third control signaling; and then, send data or information on the uplink data channel according to the TBS.

For other steps in this embodiment, refer to corresponding steps shown in FIG. 15, and details are not described herein again.

In this embodiment, after control signaling is generated, a TBS needs to be determined, where the TBS may be determined by a base station, or may be determined by a UE. Therefore, if the TBS is determined by the base station, the base station needs to notify the UE of determined information used to instruct the UE to select the TBS, so that the UE adjusts, according to the TBS, data or information sent on an uplink channel; and if the TBS is determined by the UE, that is, the UE needs to calculate the TBS after adjusting transmit power on an uplink channel, and then sends data or information on the uplink channel according to the TBS.

In this embodiment of the present invention, slow power control is performed on an uplink channel in an inner loop to trace a path loss and shadow fading, and fast power control is performed on an uplink control channel in the inner loop, which can make full use of power efficiency. In a scenario of small fast fading, sending of a relatively large TBS may be supported; and in a scenario of large fast fading, power may not be increased to avoid stronger neighboring cell interference. Particularly, fast power control is used to trace fast fading of a control channel, so that performance of the control channel is ensured.

In the embodiments of the present invention, a UE may be any one of the following and may be still or moving. A still UE may be specifically a terminal (terminal), a mobile station (mobile station), a subscriber unit (subscriber unit), a station (station), or the like. A moving UE may be specifically a cellular phone (cellular phone), a personal digital assistant (PDA, personal digital assistant), a modem (modem), a wireless communications device, a handheld device (handheld), a laptop computer (laptop computer), a cordless phone (cordless phone), a wireless local loop (WLL, wireless local loop) station, or the like. The UE may be distributed in an entire wireless network.

It should be noted that in this specification, relation terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . ." does not, without more constraints, preclude the existence of additional identical elements in the process, method, article, or apparatus that includes the element.

According to the foregoing descriptions of the embodiments, a person skilled in the art may clearly understand that the present invention may be implemented by software in addition to a necessary universal hardware platform or by hardware only. In most circumstances, the former is a preferred implementation manner. Based on such an understanding, the technical solutions of the present invention essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

The foregoing descriptions are merely exemplary implementation manners of the present invention. It should be noted that a person of ordinary skill in the art may make several improvements or polishing without departing from the principle of the present invention and the improvements or polishing shall fall within the protection scope of the present invention.

What is claimed is:

1. A power control method, comprising:
    performing a slow fading evaluation on an uplink channel of a user equipment (UE) to obtain a slow fading value of the uplink channel;
    comparing the slow fading value with a target slow fading value to obtain a first comparison result;
    generating, according to the first comparison result, first control signaling of a downlink channel corresponding to the uplink channel, wherein the first control signaling is used to instruct the UE to adjust transmit power of the UE on the uplink channel;
    evaluating receive power on the uplink channel to obtain an evaluation value of the receive power on the uplink channel;
    comparing the evaluation value of the receive power with a receive power value received last time, to obtain a second comparison result;
    generating third control signaling of the downlink channel according to the second comparison result, wherein the third control signaling is used to instruct the UE to select a transport block size (TBS);
    sending the first control signaling to the UE; and
    sending the third control signaling to the UE.

2. The method according to claim 1, further comprising:
    evaluating a signal-to-interference ratio of the uplink channel to obtain an evaluation value of the signal-to-interference ratio of the uplink channel;
    generating second control signaling of the downlink channel according to the evaluation value of the signal-to-interference ratio, wherein the second control signaling is used to instruct the UE to select a transport block size (TBS); and
    sending the second control signaling to the UE.

3. The method according to claim 1, wherein the method further comprises:
    when the slow fading evaluation is performed on the uplink channel, tracing fast fading on an uplink control channel comprised by the uplink channel, to obtain a fast fading value of the uplink control channel;
    comparing the fast fading value with a target fast fading value to obtain a third comparison result;
    generating, according to the third comparison result, a transmit power control (TPC) command of a downlink control channel corresponding to the uplink control channel, wherein the TPC command is used to instruct the UE to adjust transmit power of the UE on the uplink control channel according to the TPC command; and
sending the TPC command to the UE.

4. The method according to claim 1, wherein the slow fading value of the uplink channel is derived from at least one of the following:
a change of a path loss; and
a change of shadow fading.

5. A power control method, comprising:
receiving, by a user equipment (UE), first control signaling sent by a network side device, wherein the first control signaling is control signaling that is used to instruct the UE to adjust transmit power of the UE on an uplink channel and is generated after the network side device compares a slow fading value of the uplink channel of the UE with a target slow fading value;
adjusting, by the UE, the transmit power of the UE on the uplink channel according to the first control signaling;
calculating, by the UE, a difference between transmit power and average transmit power on a downlink control channel within a preset period of time, wherein the downlink control channel is a downlink control channel comprised by a downlink channel corresponding to the uplink channel;
obtaining, by the UE according to the difference, a serving grant (SG) of an uplink data channel comprised by the uplink channel;
determining, by the UE, a transport block size (TBS) according to the SG; and
adjusting, by the UE according to the TBS, data sent by the UE on the uplink data channel.

6. The method according to claim 5, further comprising:
receiving, by the UE, second control signaling sent by the network side device, wherein the second control signaling is control signaling that is used to instruct, after the network side device performs a slow fading evaluation on the uplink channel, the UE to select a transport block size (TBS);
selecting, by the UE, the TBS according to the second control signaling; and
adjusting, by the UE according to the selected TBS, the data sent on the uplink data channel.

7. The method according to claim 5, further comprising:
receiving, by the UE, a transmit power control (TPC) command sent by the network side device, wherein the TPC command is a TPC command that is used to adjust transmit power on an uplink control channel and is generated after the network side device compares a fast fading value of the uplink control channel with a target fast fading value; and
adjusting, by the UE according to the TPC command, the transmit power on the uplink control channel comprised by the uplink channel.

8. The method according to claim 5, wherein the slow fading value of the uplink channel is derived from at least one of the following:
a change of a path loss; and
a change of shadow fading.

9. A power control apparatus, comprising:
a first evaluating unit, configured to perform a slow fading evaluation on an uplink channel of a user equipment (UE) to obtain a slow fading value of the uplink channel;

a first comparing unit, configured to compare the slow fading value obtained by the first evaluating unit with a target slow fading value to obtain a first comparison result;
a first generating unit, configured to generate, according to the first comparison result that is obtained by the first comparing unit by means of comparison, first control signaling of a downlink channel corresponding to the uplink channel, wherein the first control signaling is used to instruct the UE to adjust transmit power on the uplink channel;
a first sending unit, configured to send the first control signaling generated by the first generating unit to the UE;
a third evaluating unit, configured to evaluate receive power on the uplink channel to obtain an evaluation value of the receive power on the uplink channel;
a second comparing unit, configured to compare the evaluation value of the receive power that is obtained by the third evaluating unit by means of the evaluation with a receive power value received last time, to obtain a second comparison result;
a third generating unit, configured to generate third control signaling of the downlink channel according to the second comparison result obtained by the second comparing unit, wherein the third control signaling is used to instruct the UE to select a transport block size (TBS); and
a third sending unit, configured to send the third control signaling generated by the third generating unit to the UE.

10. The apparatus according to claim 9, further comprising:
a second evaluating unit, configured to evaluate a signal-to-interference ratio of the uplink channel to obtain an evaluation value of the signal-to-interference ratio of the uplink channel;
a second generating unit, configured to generate second control signaling of the downlink channel according to the evaluation value of the signal-to-interference ratio that is obtained by the second evaluating unit, wherein the second control signaling is used to instruct the UE to select a transport block size (TBS); and
a second sending unit, configured to send the second control signaling generated by the second generating unit to the UE.

11. The apparatus according to claim 9, further comprising:
a tracing unit, configured to:
when the first evaluating unit performs the slow fading evaluation on the uplink channel, trace fast fading on an uplink control channel comprised by the uplink channel, to obtain a fast fading value of the uplink control channel;
a third comparing unit, configured to compare the fast fading value obtained by the tracing unit with a target fast fading value to obtain a third comparison result;
a fourth generating unit, configured to generate, according to the third comparison result obtained by the third comparing unit, a transmit power control (TPC) command of a downlink control channel corresponding to the uplink control channel, wherein the TPC command is used to instruct the UE to adjust transmit power on the uplink control channel according to the TPC command; and
a fourth sending unit, configured to send the TPC command generated by the fourth generating unit to the UE.

12. The apparatus according to claim 9, wherein the slow fading value of the uplink channel is derived from at least one of the following:
- a change of a path loss; and
- a change of shadow fading.

13. A power control apparatus, comprising:
- a first receiving unit, configured to receive first control signaling sent by a network side device, wherein the first control signaling is control signaling that is used to instruct to adjust transmit power on an uplink channel and is generated after the network side device compares a slow fading value of the uplink channel of a user equipment (UE) with a target slow fading value;
- a first adjusting unit, configured to adjust the transmit power on the uplink channel according to the first control signaling received by the first receiving unit;
- a calculating unit, configured to:
  - after the first adjusting unit adjusts the transmit power on the uplink channel, calculate a difference between transmit power and average transmit power on a downlink control channel within a preset period of time, wherein the downlink control channel is a downlink control channel comprised by a downlink channel corresponding to the uplink channel;
- a first determining unit, configured to obtain, according to the difference obtained by the calculating unit by means of calculation, a serving grant (SG) of an uplink data channel comprised by the uplink channel;
- a second determining unit, configured to determine a transport block size (TBS) according to the SG obtained by the first determining unit; and
- a sending unit, configured to send data on the uplink data channel according to the TBS determined by the second determining unit.

14. The apparatus according to claim 13, further comprising:
- a second receiving unit, configured to receive second control signaling sent by the network side device, wherein the second control signaling is control signaling that is used to instruct, after the network side device performs a slow fading evaluation on the uplink channel, the UE to select a transport block size (TBS);
- a selecting unit, configured to select the TBS on the uplink channel according to the second control signaling received by the second receiving unit; and
- a second adjusting unit, configured to adjust, according to the TBS selected by the selecting unit, the data sent on the uplink data channel.

15. The apparatus according to claim 13, further comprising:
- a third receiving unit, configured to receive a transmit power control (TPC) command sent by the network side device, wherein the TPC command is a TPC command that is used to adjust transmit power on an uplink control channel and is generated after the network side device compares a fast fading value of the uplink control channel comprised by the uplink channel with a target fast fading value; and
- a third adjusting unit, configured to adjust the transmit power on the uplink control channel according to the TPC command received by the third receiving unit.

16. The apparatus according to claim 13, wherein the slow fading value of the uplink channel is derived from at least one of the following:
- a change of a path loss; and
- a change of shadow fading.

* * * * *